United States Patent

Kaitsu et al.

[11] Patent Number: 5,774,783
[45] Date of Patent: Jun. 30, 1998

[54] MAGNETIC RECORDING MEDIUM

[75] Inventors: Isatake Kaitsu; Iwao Okamoto; Masayoshi Shinohara, all of Kanagawa, Japan

[73] Assignee: Fujitsu Limited, Kawasaki, Japan

[21] Appl. No.: 594,762

[22] Filed: Jan. 31, 1996

[30] Foreign Application Priority Data

| Mar. 17, 1995 | [JP] | Japan | 7-059012 |
| Jun. 27, 1995 | [JP] | Japan | 7-160437 |
| Nov. 17, 1995 | [JP] | Japan | 7-299785 |

[51] Int. Cl.$^6$ .................... G11B 5/64
[52] U.S. Cl. .................... 428/546; 428/561; 428/611; 428/668; 428/694 T; 428/694 TS; 428/457; 428/450; 428/900
[58] Field of Search .................... 428/611, 546, 428/561, 627, 632, 668, 673, 675, 694 T, 694 TS, 900, 457, 450

[56] References Cited

U.S. PATENT DOCUMENTS

| 4,675,240 | 6/1987 | Weiss | 428/611 |
| 5,062,938 | 11/1991 | Howard | 204/192.2 |
| 5,476,680 | 12/1995 | Coffey et al. | 427/130 |
| 5,573,863 | 11/1996 | Hayakawa et al. | 428/684 T |
| 5,585,196 | 12/1996 | Inomata et al. | 428/557 |

FOREIGN PATENT DOCUMENTS

| 59-42642 | 3/1984 | Japan. |
| 59-142735 | 8/1984 | Japan. |
| 59-220907 | 12/1984 | Japan. |
| 60-209918 | 10/1985 | Japan. |
| 62-117143 | 5/1987 | Japan. |
| 63-175220 | 7/1988 | Japan. |
| 1256017 | 10/1989 | Japan. |
| 2216609 | 8/1990 | Japan. |
| 4366417 | 12/1992 | Japan. |
| 554357 | 3/1993 | Japan. |
| 598141 | 1/1994 | Japan. |
| 6187628 | 7/1994 | Japan. |
| 76359 | 1/1995 | Japan. |

*Primary Examiner*—Stevan A. Resan
*Attorney, Agent, or Firm*—Greer, Burns & Crain, Ltd.

[57] ABSTRACT

The present invention relates to a magnetic recording medium for use in an external memory device of an information processing apparatus etc., and an object thereof is to reduce noise, achieve high coercive force, and use the substance as a magnetic recording medium for detecting signals in a magnetoresistance head. In the magnetic recording medium comprising the magnetic recording layer 25 including ferromagnetic grains 22 and a nonmagnetic substance 23, the improvement in structure comprises that the ferromagnetic grains 22 are formed to have respectively an average grain diameter of 50 nm or less and not to be overlapped in the film thickness direction and to be isolated in the direction along a layer surface, and that a product of residual magnetization and a film thickness of the magnetic recording layer 25 is less than or equal to 150 Gauss•$\mu$m.

4 Claims, 16 Drawing Sheets

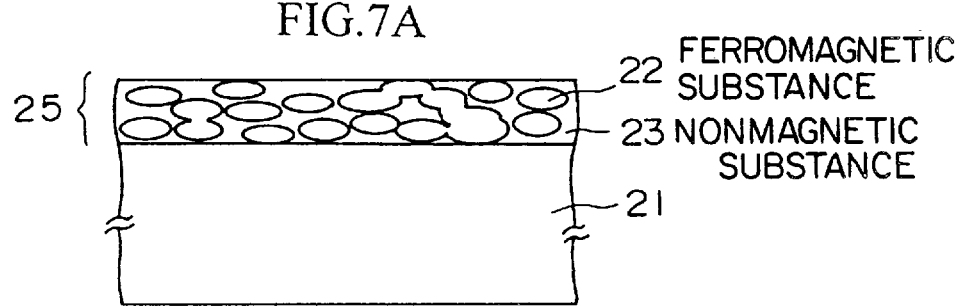
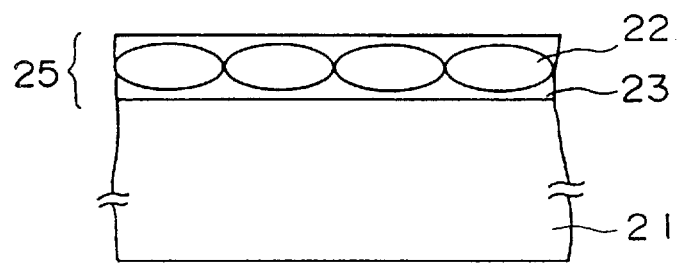
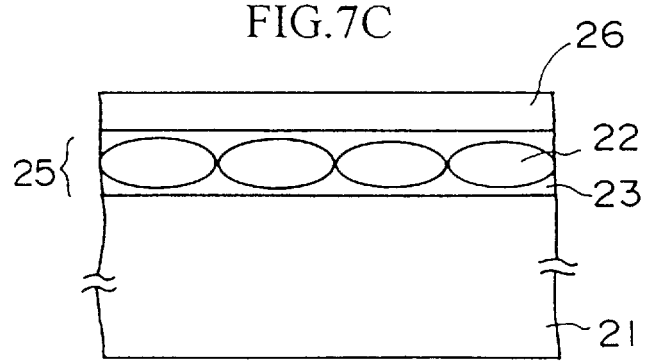

MAGNETIC RECORDING MEDIUM

BACKGROUND OF THE INVENTION

1. Field of the Invention

The present invention relates to a magnetic recording drive, a magnetic recording medium and a method for manufacturing the same and, more particularly, to a magnetic recording drive for use in an external memory device of an information processing apparatus etc., a magnetic recording medium used therein and a method for manufacturing the same.

2. Description of the Prior Art

In the magnetic recording drive, improvement of the recording density has been demanded more and more with an increase of an amount of information in proportion. When recording density of the conventional magnetic recording medium is increased, a S/N ratio is degraded to cause reduction of a reproducing output and increase of noise. Therefore, the magnetic recording medium enabling a large reproducing output and low noise has been demanded.

In particular, the problem is to achieve noise reduction in the magnetic recording medium since reading sensitivity has been extremely improved by practical use of the magnetoresistance head.

As a main factor of generating the noise in the magnetic recording medium, there is unclear boundary of the magnetization transition regions due to variation in magnetization in magnetization transition regions. The variation in magnetization is caused by magnetic interaction between crystal grains of the ferromagnetic film constituting the ferromagnetic layer.

In order to reduce noise in the magnetic recording medium, it is required to weaken the magnetic interaction between crystal grains of the ferromagnetic film.

In general, as the recording layer of the conventional magnetic recording medium, a thin film which is formed of cobalt (Co)-based ternary or quaternary alloy by sputtering may be used. By adjusting composition of the thin film and manufacturing conditions, segregation in the ferromagnetic portion and the nonmagnetic portion can be facilitated to reduce the noise.

In the conventional magnetic recording medium, as shown in FIG. 1, for example, a chromium layer 2, a magnetic recording layer 3 consisting of $CoCr_{12}Ta_2$, and a protection layer 4 consisting of a carbon film are formed in that sequence on a nonmagnetic substrate 1 which is formed of an Al substrate covered with a NiP film.

However, since a cobalt system alloy constituting the recording layer 3 is inherently a solid solution, it is difficult to isolate crystal grains of the ferromagnetic film perfectly even if segregation is accelerated by adjusting composition and manufacturing conditions.

As the way of isolating crystal grains of the magnetic substance, Patent Application Publication (KOKAI) JP59-42642 and Patent Application Publication (KOKAI) JP59-220907 have set forth manufacturing methods such that a binary or ternary alloy layer comprising the nonmagnetic substance such as silver and copper and the ferromagnetic film which is insoluble in this nonmagnetic substance is once formed by sputtering, and then the alloy layer is heated.

In the manufacturing methods set forth in these publications (KOKAIs), the ferromagnetic layer is heated at a temperature of less than 400° C. to accomplish high coercive force. Since a glass or polymer film is utilized as a substrate for supporting the magnetic recording film, the heating temperature of less than 400° C. is preferable.

In both Publications, the manufacturing methods for forming the magnetic recording film which has film thickness of 130 to 150 nm and t•Br value of 2000 Gauss•$\mu$m have been set forth. The t•Br value is denoted as a product of residual magnetization Br and a film thickness t of the magnetic recording medium (magnetic recording film).

However, in the magnetic recording medium for use in the magnetoresistance head, it is requested that the thickness of the magnetic recording layer would be set to be lower than or equal to 30 nm and also the t•Br value would be set to be lower than or equal to 150 Gauss•$\mu$m. In the case of manufacturing of the magnetic recording layer, the techniques set forth in these publications cannot be applied as they are. This is because of the following reasons.

First, the relation between recording density and effective output voltage in the magnetic recording medium for use in the magnetoresistance head has been well known as described in FIG. 2.

In FIG. 2, in case the recording density is small like about 10, 20 kFRPI, the effective output is increased if the t•Br value is increased. But, in case the recording density is large like about 50, 100 KFRPI, the effective output voltage is decreased when the t•Br value is increased.

For this reason, if the recording density is increased up to about 50, 100 kFRPI, the t•Br value of the magnetic recording layer must be set to be lower than 150 Gauss•$\mu$m.

However, even if, under the conditions set forth in the above publications, it has been tried to accomplish the t•Br value of less than 150 Gauss•$\mu$m by forming the magnetic recording layer of less than 30 nm in thickness. However, even under these conditions, noise reduction and large coercive force have not been achieved since crystal grains in the magnetic recording layer are small and further partially continuous with each other in such circumstances.

Next, it can be considered that the magnetic recording layer 3 formed of $CoCr_{12}Ta_2$ is formed thinner. For example, as shown in FIG. 1, the chromium layer 2 of 100 nm in thickness and the magnetic recording layer 3 of 20 nm in thickness are formed in that order on the nonmagnetic substrate 1 formed of a two-layered structure consisting of Al and NiP, and then the protection layer 4 formed of carbon is formed thereon to have a thickness of 20 nm. At this time, the t•Br value is about 100 Gauss•$\mu$m.

While the relation between the recording signal frequency and noise power in the magnetic recording layer has been investigated using the magnetoresistance reproducing head, the result has been derived as shown by the broken line in FIG. 9. It has been appreciated that noise power is increased linearly in proportion as the recording signal frequency is increased. As a result, it has been found that the thinned $CoCr_{12}Ta_2$ is not fit for the magnetic recording layer used for high recording signal frequency.

In the examination in FIG. 2, a relative velocity between the magnetic head and the magnetic recording medium is selected as 10 m/s, the recording signal frequency is set to 20 MHz, and the recording density is selected as about 100 kFRPI.

As has been stated above, regarding a granular magnetic film (Fe-$SiO_2$) in which magnetic fine grains are dispersed into the $SiO_2$ film, the following problem is caused in addition to the problem of the magnetic characteristic due to crystal property of the magnetic recording film.

It has been recited in Applied Physics Letter, 52 (6), 512 (1988) and U.S. Pat. No. 4,973,525 that, in the above granular magnetic film, crystal property of the magnetic substance fine grains has been improved and also more preferable magnetic characteristics and recording/reproducing characteristics could be achieved by controlling the substrate temperature appropriately at the time of film-formation.

Thereby, there is a tendency that, in the granular magnetic film, segregation of the magnetic substance has too small size in the state of as-grown to show enough coercive force. It has been seen that, in order to increase coercive force, the annealing must be effected after growing the film to increase the volume of each segregation.

On the contrary, conventionally a NiP plated substrate has been used mainly as the substrate for the magnetic recording medium. But, the NiP layer formed on a surface of the substrate has been crystallized by heating at a temperature in excess of 300° C. Thus, there are caused some problems that flatness of the surface of the layer is damaged, the layer is magnetized, or the like. It is evident that such substrate is not adequate for heating process at a high temperature.

In recent years, it has been considered that, on the trend of downsizing, the magnetic disk is reduced in size to have the same size as the IC card. In this case, a thickness of the magnetic disk must be formed less than 3 mm. In this case, a thickness of the substrate must also be formed less than 0.3 mm, but it is the problem to use the NiP plated substrate in the respect of mechanical strength.

Like this, a glass substrate or a single crystal substrate in place of the Ni-P plated substrate is examined to proceed thinner-layered structure and planarization of the magnetic recording medium. For example, it has been proposed in Patent Application Publication (KOKAI) 59-96538 that the structure in which a chromium (Cr) layer, a magnetic film, and a protection film are grown in sequence on the single crystal substrate may be used as the magnetic recording medium.

From the previous discussion, it is of course necessary to consider that, after the $Fe-SiO_2$ granular magnetic film is grown in the single crystal silicon substrate, the granular magnetic film must be treated by heating process. In that case, it will be supposed that the $SiO_2$ film covering the granule of Fe serves to prevent the reaction between the silicon substrate and the granule.

However, based on the experiments effected by the inventors of the present invention, it has been found that, when the granular magnetic film formed on the silicon substrate is heated at a high temperature, atoms of the magnetic substance and silicon atoms are mutually diffused passing through the grain boundaries in the granular magnetic film, so that paramagnetic silicon compounds are formed to thus reduce the value of saturation magnetization (Ms) of the magnetic recording medium.

Especially, in the magnetic recording medium in which a low t•Br value (where t is a thickness of the magnetic layer, and Br is a magnitude of residual magnetization) is required to be used together with the MR head, it causes a serious problem that the magnetic grain is wasted to form silicon compounds since an amount of the magnetic grain in the magnetic film is absolutely small.

On the other hand, when the magnetic recording medium is formed of a plurality of different material layers and thereafter it is heated, there may be a risk of causing a separation of the layers due to difference between coefficients of thermal expansion of the layers.

SUMMARY OF THE INVENTION

A first object of the present invention is to provide a method for manufacturing a magnetic recording medium, which is capable of reducing noise and achieving high coercive force and is fit for a magnetoresistance head.

In the present invention, a nonmagnetic film, a ferromagnetic film and the nonmagnetic film are formed separately on a substrate, then a resultant structure is annealed to distribute crystal grains of the ferromagnetic film into the nonmagnetic film, whereby a recording layer is formed.

Thus, the crystal grains of the ferromagnetic film may be spaced and isolated from each other such that all adjacent crystal grains of the ferromagnetic film do not magnetically interact with each other in the recording layer. In this case, if the nonmagnetic substance in which the ferromagnetic film is scarcely soluble is utilized, the above tendency becomes particularly conspicuous.

Therefore, by making distribution of magnetization uniform in the magnetic recording medium, a noise characteristic can be improved which is caused by uneven distribution of magnetization in magnetization transition regions and their peripheral regions of the magnetic recording medium.

Furthermore, according to the above manufacturing method, such a recording layer can be formed that has a thin film thickness, realizes satisfactory coercive force, and attains 150 Gauss•$\mu$m or less, preferably 100 Gauss•$\mu$m or less in a product of residual magnetic flux density and a film thickness. As a result, large reproducing output which is fit for high sensitivity performance of the MR head can be obtained.

In addition, if the magnetic recording layer is annealed at a high temperature, for example, 400° C. or more so as to facilitate mutual diffusion and also to produce crystal structures for generating sufficient magnetization as distributed crystal grains of the ferromagnetic film, further large coercive force can be obtained.

In the above description, as a substance of the ferromagnetic film, cobalt or an alloy including the cobalt as a major constituent, for instance, $Co_ACr_{100-A}$ (A is 90 or more), $Co_APt_{100-A}$ (A is 70 or more, or 40 to 50) or $Co_ASm_{100-A}$ (A is 83.3 or 89.5) may be used. As a substance of the nonmagnetic film, metal, oxide, nitride, carbon or carbide may be used.

Moreover, as a substance of the nonmagnetic film, it is preferable to use a substance which has a solid solubility of cobalt of 5% or less, for instance, metal such as silver or copper, silicon oxide or zirconium oxide, titanium nitride or silicon nitride, carbon or carbide, or the like.

Also, a high heat-resistant material, for instance, silicon or carbon, is suitable for a substance of the nonmagnetic substrate.

In addition, in the present invention, the magnetic recording layer of an alloy consisting of the ferromagnetic film and the nonmagnetic substance is formed on the heat-resistant nonmagnetic substrate to have a thickness of 30 nm or less, and then the magnetic recording layer is annealed during it is being formed or after it is formed, whereby plural isolated grains formed of the ferromagnetic film and having an average grain diameter of 50 nm or less are obtained.

In the magnetic recording layer thus formed, since the grains of the ferromagnetic film can be formed to have large size and isolated from each other, variations in magnetization in magnetization transition portions can be suppressed. Therefore, in contrast to the conventional device, noise can be reduced upon recording or reproducing signals, and dependency of noise power on recording signal frequency can also be eliminated.

Also, in the case in which the magnetic recording layer having a film thickness of less than 30 nm is formed, it has been experimentally confirmed that coercive force of the magnetic recording layer may be increased if an annealing temperature is set at 400° C. or more, preferably in a range of 400° to 550° C. while coercive force may not be increased if the annealing temperature is set at 400° C. or less.

Accordingly, the magnetic recording layer having high signal quality (high SIN) and high recording density may be obtained.

Besides, if a t•Br value of the magnetic recording layer is set lower than or equal to 150 Gauss•μm, the magnetic recording layer is most suitable for the magneto-resistance head.

A second object of the present invention is to provide a magnetic recording medium capable of preventing a separation of layers constituting it and suppressing degradation of coercive force by preventing a reaction between silicon in the silicon substrate and magnetic substance in a granular magnetic film, and a method for manufacturing the same, and a magnetic recording device utilizing such magnetic recording medium.

According to the present invention, the nonmagnetic layer including no magnetic grain therein is formed between the nonmagnetic layer including magnetic grains therein and the silicon substrate. The nonmagnetic layer including the magnetic grains therein serves as the granular magnetic layer, and the nonmagnetic layer including no magnetic grain therein serves as a diffusion preventing layer. Thus, mutual diffusion of the silicon in the silicon substrate and the magnetic grains due to annealing may be prevented by the diffusion preventing layer.

Therefore, since the silicon containing the magnetic material is not formed, reduction of the magnetic material may be prevented so that the magnetic recording medium having large coercive force and high recording density can be achieved. In addition, since the granular magnetic layer and the diffusion preventing layer excepting the magnetic fine grains are formed by the same substance, difference in thermal stress does not occur in the granular magnetic layer and the diffusion preventing layer. Thus, a stable layer structure can be obtained without the possibility of film exfoliation. A silicon oxide film, for example, can be listed as the nonmagnetic layer. There are iron, cobalt and nickel, for example, as the magnetic grain. Further, an adhesion between a silicon dioxide layer and a silicon substrate is extremely superior and there is no risk of a separation therebetween.

Besides, it may be considered to form the diffusion preventing layer with nonmagnetic material which has the same coefficient of thermal expansion as the nonmagnetic material constituting a granular magnetic layer and the different composition from it. However, it requires much labor that two kinds of nonmagnetic material need to be separately alloyed. In order to avoid this, it is preferable that their kinds are same.

If a product (t•Br) of a thickness (t) and residual magnetization (Br) of the granular magnetic layer is set at 100 Gauss•μm or less in such structure, the magnetic recording medium which is most suitable for signal detection by the magnetoresistance head can be derived.

Incidentally, in the case the silicon substrate is heated, it is neither magnetized nor deformed even if it is heated at a temperature in excess of 300° C., for example, 1000° C.

BRIEF DESCRIPTION OF THE DRAWINGS

FIGS. 7A to 7C are sectional views showing respectively manufacturing steps of a magnetic recording medium according to a fourth embodiment of the present invention;

FIGS. 23A to 23C are sectional views showing details around the MR head and the magnetic recording medium in the magnetic recording device shown in FIG. 22, wherein FIG. 23A shows an in-gap type MR head, FIG. 23B shows a common type MR head, and FIG. 23C shows a yoke type MR head.

DESCRIPTION OF THE PREFERRED EMBODIMENTS

There will now be described preferred embodiments of the present invention hereinafter with reference to the accompanying drawings.

Figure 3A:
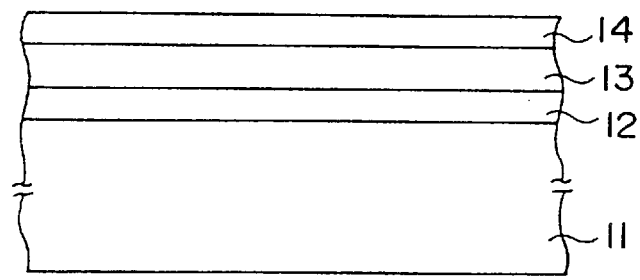
FIGS. 3A to 3C are sectional views showing a method for manufacturing a magnetic recording medium according to a first embodiment of the present invention.
Figure 3B:
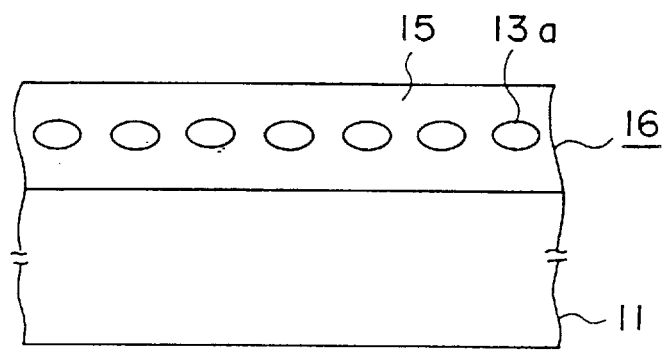
Figure 3C:
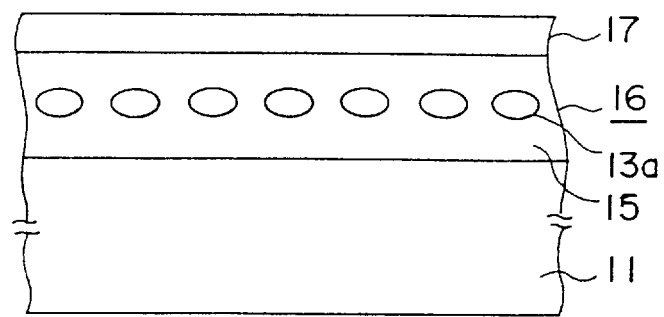

(1) Explanation of a method for manufacturing a magnetic recording medium according to a first embodiment of the present invention:

FIGS. 3A to 3C are sectional views showing a manufacturing method of the magnetic recording medium according to the first embodiment of the present invention.

First, as shown in FIG. 3A, a silver (Ag) film (nonmagnetic film) 12 having a film thickness of 5 nm is formed by sputtering on a silicon substrate (nonmagnetic substrate) 11 having a diameter of 2.5 inch, for example, under the conditions that argon pressure is 5 mTorr, a substrate temperature is 20° C., a DC power is 0.2 kW, and a DC bias voltage is not applied.

Then, a cobalt (Co) film (ferromagnetic film) 13 of 7 nm in film thickness is formed on the silver film 12 by sputtering under the conditions that argon pressure is 5 mTorr, a substrate temperature is 20° C., a DC power is 0.2 kW, and a DC bias voltage is not applied.

Subsequently, a silver (Ag) film 14 having a film thickness of 5 nm is formed on the cobalt film 13 by sputtering under the conditions that argon pressure is 5 mtorr, a substrate temperature is 20° C., a DC power is 0.2 kW, and a DC bias voltage is not applied. Film thicknesses of the silver films 12, 14 and the cobalt film 13 are determined such that a product (t•Br) of residual magnetic flux density (Br) and a film thickness (t) of the recording layer is about 100 Gauss•μm.

Next, in low pressure atmosphere having pressure of less than $5 \times 10^{-6}$ Torr, annealing process is effected at a temperature of 450° C. for 60 minutes. Oxidation of the silver films 12, 14 and the cobalt film 13 can be prevented because of low pressure atmosphere, and silver and cobalt are mutually diffused according to the annealing temperature. As shown in FIG. 3B, cobalt is crystallized to thus form cobalt crystal grains 13a having several nm or several tens nm in size, so that they are spread into the silver film 15 and the crystal grains 13a are Isolated from each other. Thereby, the recording layer 16 in which the crystal grains 13a of cobalt are dispersed into the silver film 15 is formed. Since the cobalt film 13 is formed to be continuous before anneal-ing process, its coercive force can be small. By annealing process, the crystal grains 13a of cobalt are scattered into the recording layer 16, so that large coercive force can be attained. Furthermore, if crystal structures of cobalt are formed as hexagonal closest packed (hcp) structures by annealing process, larger coercive force can be attained.

In addition, it Is necessary to adjust the annealing temperature suitably according to material of the nonmagnetic film and the ferromagnetic film. In general, if substances of the nonmagnetic film and the ferromagnetic film have higher melting points, then the required annealing temperature is increased in proportion. It has been found from our experiments that, if the annealing temperature exceeds 400° C., mutual diffusion of silver and cobalt occurs within a practical annealing temperature, and also the hcp structures can readily be formed as crystal structures of the cobalt crystal grains 13a. Therefore, annealing time can be properly adjusted in a range of the annealing temperature in excess of 400° C.

Then, as shown in FIG. 3C, a carbon (C) film 17 of 10 nm in film thickness is formed on the recording layer 16 by sputtering under the conditions that argon pressure is 10 mTorr, a substrate temperature is 20° C., a DC power is 1 kW, and a DC bias voltage is not applied, thus completing a magnetic recording medium.

Next, the measured result of noise power with respect to the above magnetic recording medium will be explained.

Figure 4:
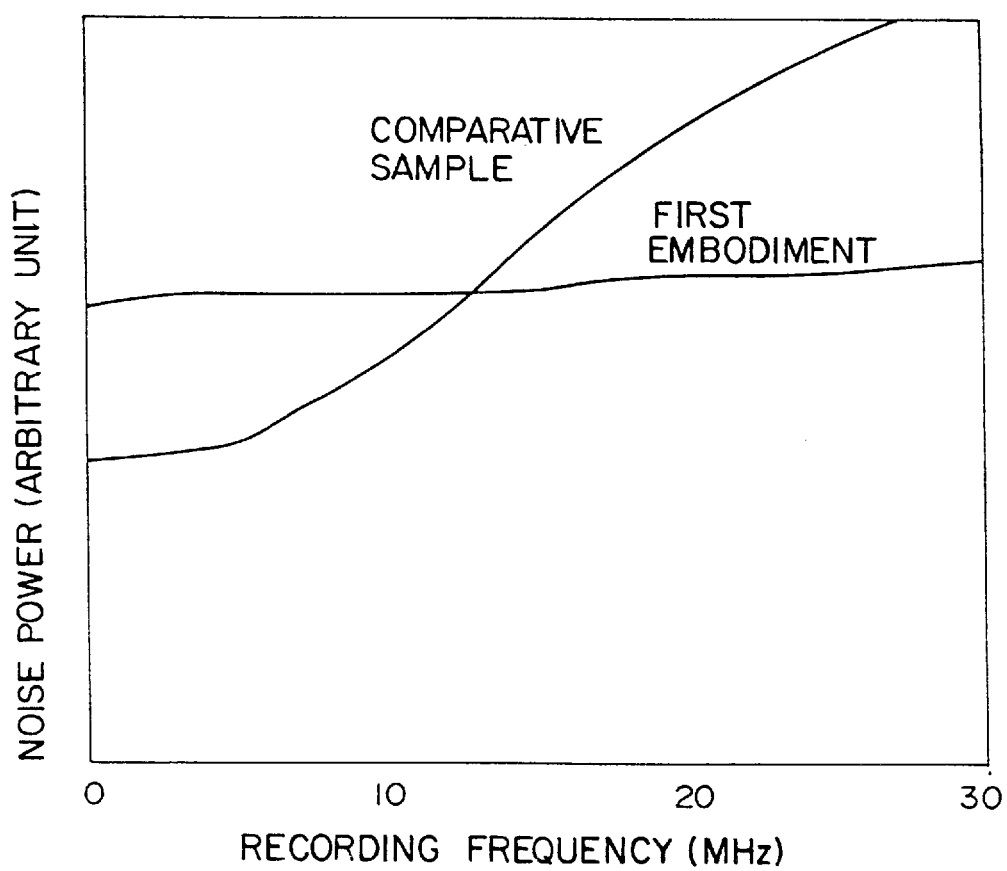
FIG. 4 is a characteristic view showing the measured result of noise power of the magnetic recording medium manufactured by the manufacturing method according to the first embodiment of the present invention.

FIG. 4 is a characteristic view showing the dependency of noise power on the recording frequency. The abscissa indicates a recording frequency (MHz) represented in a linear scale while the ordinate indicates noise power represented in arbitrary unit.

Figure 1:
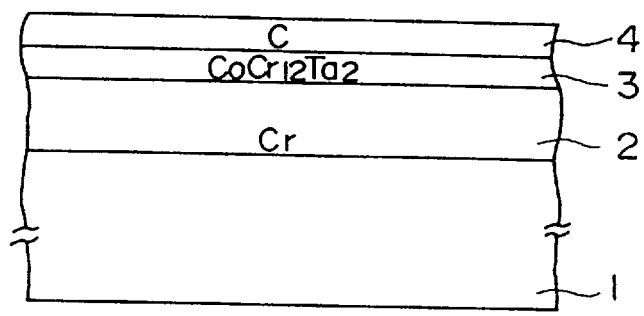
FIG. 1 is a sectional view showing a conventional magnetic recording medium.
Figure 2:
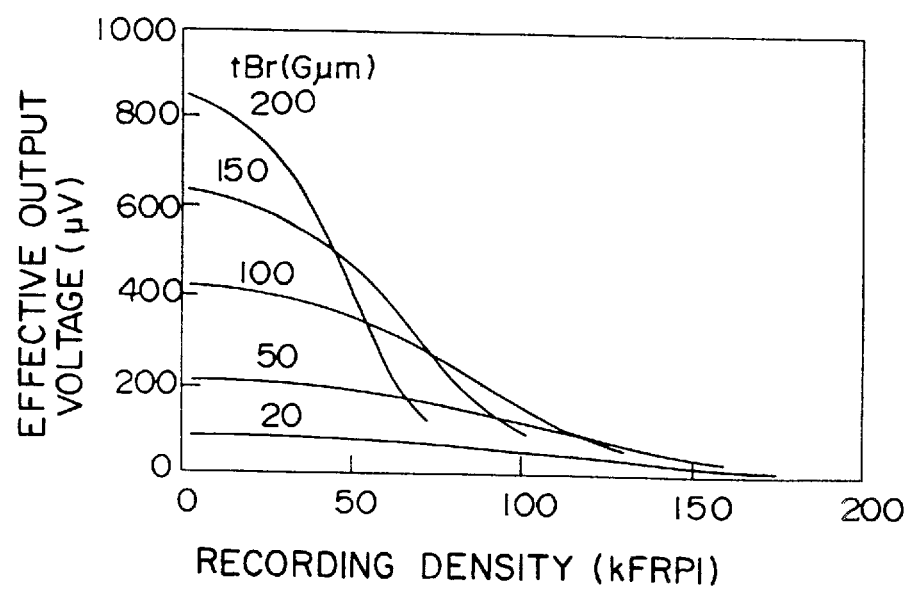
FIG. 2 is a view showing a typical relation between recording density and effective output voltage in the magnetic recording medium.

For purposes of comparison, noise power with respect to the magnetic recording medium according to the comparative example is also given in the characteristic view of FIG. 4. The magnetic recording medium according to the comparative example has the structure shown in FIG. 1. More particularly, the chromium film 2 having a thickness of 100 nm, the recording layer 3 made of $CoCr_{12}Ta_2$ film having a thickness of 20 nm, and the protection layer 4 made of the carbon film having a thickness of 20 nm were formed in that order on the nonmagnetic recording medium 1 which is formed of an Al substrate covered with a Ni-P film. The t•Br product of the magnetic recording medium in FIG. 1 is set as about 100 Gauss•μm.

The MR head was used as the reproducing head. At this time, the circumferential velocity (i.e., relative velocity between the head and the magnetic recording medium) was selected as 10 m/s, and the recording density was about 100 (KFCI) at the recording frequency of 20 MHz.

It has been seen from FIG. 4 that noise power hardly changes with respect to the recording frequency in the magnetic recording medium according to the first embodiment, whereas noise power significantly changes with the recording frequency in the magnetic recording medium according to the conventional example. Particularly, noise power increases linearly with increase of the recording frequency.

In the frequency range lower than the recording frequency of 12 to 13 MHz, noise power caused by the magnetic recording medium according to the comparative example is smaller. On the contrary, in the frequency range higher than the recording frequency of 12 to 13 MHz, noise power caused by the magnetic recording medium according to the first embodiment is smaller. For example, assuming that noise power of the comparative example is set as 1 at the recording frequency of 20 MHz, noise power of the first embodiment becomes 0.8 at the same frequency, as shown in Table I. Accordingly, the magnetic recording medium according to the first embodiment is favorable to the high frequency range.

As discussed earlier, in the manufacturing method of the magnetic recording medium according to the first embodiment of the present invention, in order to form the recording layer 16, the silver film (nonmagnetic film) 12, the cobalt film (ferromagnetic film) 13, and the silver film (nonmagnetic film) 14 are formed in this sequence and separately, then crystal grains 13a of cobalt (ferromagnetic film) are dispersed into the silver film 15 by annealing process.

Consequently, the crystal grains 13a of cobalt may be isolated in the recording layer 16 such that they are separated not to magnetically interact each other. Thus, magnetization distribution can be made uniform in the recording layer 16, so that the noise characteristic due to uneven magnetization distribution in magnetization transition regions and their peripheral regions of the magnetic recording medium can be improved.

Further, according to the above manufacturing method, since such a recording layer 16 can be formed that has a thin film thickness, realizes satisfactory coercive force, and accomplishes a product t•Br of 100 Gauss•$\mu$m or less, large reproducing output which is fit for high sensitivity performance of the MR head can be derived.

In addition, although the silver film is used as the nonmagnetic films 12, 14 in the first embodiment, a copper film may be used.

In the first embodiment, since annealing process at relatively high temperature is sometimes needed according to several kinds of materials used as the nonmagnetic films 12, 14 and the ferromagnetic film 13, the silicon substrate having excellent heat-proof property is used as the nonmagnetic substrate 11. But, a carbon substrate having excellent heat-proof property may be used similarly.

Figure 5:
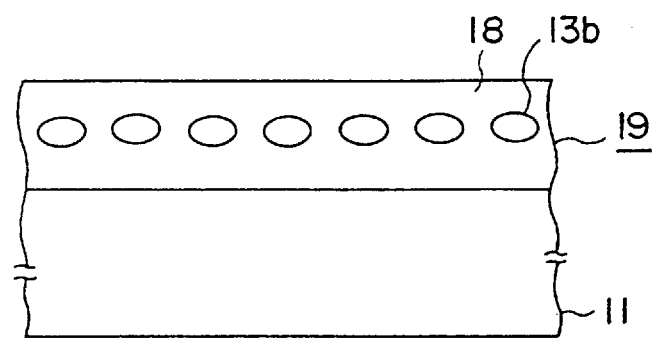
FIG. 5 is a sectional view showing a magnetic recording medium formed by a manufacturing method according to a second embodiment of the present invention.

(2) Explanation of a method for manufacturing a magnetic recording medium according to a second embodiment of the present invention:

FIG. 5 is a sectional view showing a magnetic recording medium manufactured by a manufacturing method according to a second embodiment of the present invention. The second embodiment differs from the first embodiment in that a carbon film is used in place of the silver films between which the cobalt film is put. Also, since a carbon film 18 is utilized on the uppermost portion of the recording layer 19, the protection layer is shared with the carbon film 18 on the recording layer 19.

Referring to FIG. 5, the second embodiment of the present invention will be explained hereinafter.

First, a carbon film (nonmagnetic film) having a film thickness of 5 nm is formed by sputtering on a silicon substrate (nonmagnetic substrate) 11 under the conditions that argon pressure is 10 mTorr, a substrate temperature is 20° C., an AC power having a frequency of 13.56 MHz is 0.2 kW, and a DC bias voltage is not applied.

In turn, a cobalt film (ferromagnetic film) of 5 nm in film thickness is formed on the carbon film by sputtering under the conditions that argon pressure is 5 mTorr, a substrate temperature is 20° C., a DC power is 0.2 kW, and a DC bias voltage is not applied.

Then, the carbon film having a film thickness of 7 nm is formed on the cobalt film by sputtering under the conditions that argon pressure is 5 mTorr, a substrate temperature is 20° C., an AC power having a frequency of 13.56 MHz is 0.2 kW, and a DC bias voltage is not applied.

Next, in low pressure atmosphere of a degree of vacuum of less than $5 \times 10^{-6}$ Torr, annealing process is effected at a temperature of 450° C. for 60 minutes. Thereby, oxidation of the carbon films and the cobalt film can be prevented, and carbon and cobalt are mutually diffused. As a result, the recording layer 19 in which crystal grains 13b of cobalt having several nm or several tens nm in size are dispersed into the carbon film 18 can be formed. At this time, since the cobalt film is formed to be continuous before annealing process, its coercive force can be small. By annealing process, the crystal grains 13b of cobalt are scattered into the recording layer 19, so that large coercive force can be attained. Further, if crystal structures of cobalt are formed as the hcp structures by annealing process, larger coercive force can be attained.

As has been described above, the magnetic recording medium has been finished.

As shown in Table I below, assuming that noise power in the conventional example is regarded as 1 at recording frequency of 20 MHz, noise power of the magnetic recording medium manufactured as above can be obtained as 0.8 which is lower than that in the conventional example.

TABLE I

| NONMAGNETIC LAYER | FERROMAGNETIC LAYER | NOISE POWER |
|---|---|---|
| Ag | Co | 0.8 |
| Ag | $Co_{90}Cr_{10}$ | 0.75 |
| Ag | $Co_{80}Pt_{20}$ | 0.8 |
| Ag | $Co_{50}Pt_{50}$ | 0.8 |
| Ag | $Co_{80}Sm_{20}$ | 0.8 |
| Ag | $Co_{89.5}Sm_{10.5}$ | 0.8 |
| C | Co | 0.8 |
| C | $Co_{90}Cr_{10}$ | 0.75 |
| C | $Co_{80}Pt_{20}$ | 0.8 |
| C | $Co_{50}Pt_{50}$ | 0.8 |
| C | $Co_{80}Sm_{20}$ | 0.8 |
| C | $Co_{69.5}Sm_{10.5}$ | 0.8 |
| Cu | Co | 0.85 |
| Cu | $Co_{90}Cr_{10}$ | 0.8 |
| Cu | $Co_{80}Pt_{20}$ | 0.8 |
| Cu | $Co_{50}Pt_{50}$ | 0.8 |
| Cu | $Co_{80}Sm_{20}$ | 0.8 |
| Cu | $Co_{89.5}Sm_{10.5}$ | 0.8 |
| TiN | Co | 0.85 |
| TiN | $Co_{90}Cr_{10}$ | 0.8 |
| TiN | $Co_{80}Pt_{20}$ | 0.75 |
| TiN | $Co_{50}Pt_{50}$ | 0.8 |
| TiN | $Co_{80}Sm_{20}$ | 0.8 |
| TiN | $Co_{89.5}Sm_{10.5}$ | 0.8 |
| $SiO_2$ | Co | 0.8 |
| $SiO_2$ | $Co_{90}Cr_{10}$ | 0.85 |
| $SiO_2$ | $Co_{80}Pt_{20}$ | 0.8 |
| $SiO_2$ | $Co_{50}Pt_{50}$ | 0.8 |
| $SiO_2$ | $Co_{80}Sm_{20}$ | 0.75 |
| $SiO_2$ | $Co_{69.5}Sm_{10.5}$ | 0.8 |
| SiN | Co | 0.8 |
| SiN | $Co_{90}Cr_{10}$ | 0.85 |
| SiN | $Co_{80}Pt_{20}$ | 0.8 |
| SiN | $Co_{50}Pt_{50}$ | 0.8 |
| SiN | $Co_{80}Sm_{20}$ | 0.75 |
| SiN | $Co_{69.5}Sm_{10.5}$ | 0.8 |
| $ZrO_2$ | Co | 0.8 |
| $ZrO_2$ | $Co_{90}Cr_{10}$ | 0.8 |
| $ZrO_2$ | $Co_{80}Pt_{20}$ | 0.85 |
| $ZrO_2$ | $Co_{50}Pt_{50}$ | 0.8 |
| $ZrO_2$ | $Co_{80}Sm_{20}$ | 0.75 |
| $ZrO_2$ | $Co_{89.5}Sm_{10.5}$ | 0.8 |

Although the protection layer is not particularly formed on the recording layer 19, the protection layer may be formed with a carbon film or the like additionally as the case may be.

Figure 6:
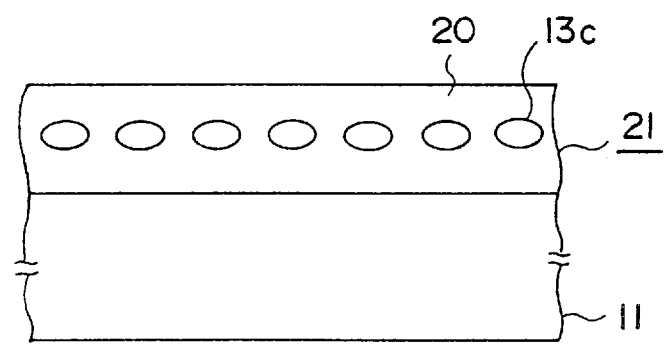
FIG. 6 is a sectional view showing a magnetic recording medium formed by a manufacturing method according to a third embodiment of the present invention.

(3) Explanation of a magnetic recording medium according to a third embodiment of the present invention:

FIG. 6 is a sectional view showing a magnetic recording medium formed by a manufacturing method according to a third embodiment of the present invention.

The third embodiment is different from the first and second embodiments in the respect that a $Co_{90}Cr_{10}$ film may be used in place of the cobalt film as the ferromagnetic film sandwiched with the nonmagnetic films.

In comparison with the Co film, the crystal structures of crystal grains of the ferromagnetic film are readily formed as the hcp structures in the $Co_{90}Cr_{10}$ film, because of existence of Cr therein. Thus, the $Co_{90}Cr_{10}$ film has a feature that high coercive force can easily be obtained.

A film forming method is the same as that used for the Co film, which has been explained in the first and second embodiments. As a result, the recording layer 21 in which the crystal grains 13c of $Co_{90}Cr_{10}$ are dispersed into the silver film 20 and mutual crystal grains 13c are perfectly isolated can be formed on the silicon substrate (nonmagnetic substrate) 11.

In this case, as shown in Table I above, assuming that noise power in the conventional example is regarded as 1 at recording frequency of 20 MHz, noise power of the magnetic recording medium manufactured as above can be obtained as 0.75 which is lower than that in the conventional example.

In the magnetic recording medium according to the first to third embodiments, the silver film or the carbon film in which Co is not soluble has been used as the non-magnetic films 12, 14 sandwiching the ferromagnetic film 13. Alternatively, any one of $SiO_2$ film, $ZrO_2$ film, TiN film and SiN film into which Co is seldom soluble may be used.

As a substance of the ferromagnetic film 13, $Co_APt_{100-A}$ (A is 70 or more, or 40 to 50) or $Co_ASm_{100-A}$ (A is 83.3 or 89.5) may be used in addition to Co or $Co_{90}Cr_{10}$.

Regarding the nonmagnetic substance and the ferromagnetic substance, Table I shows measured data of noise power caused by the magnetic recording medium if various combinations of the nonmagnetic substance and the ferromagnetic substance are utilized. It is understood that noise power becomes smaller than 1 if noise power in the conventional example is assumed as 1.

In the manufacturing method of the magnetic recording medium according to the third embodiment of the present invention, in order to form the recording layer, the nonmagnetic film, the ferromagnetic film, and the nonmagnetic film are formed in that order and separately, then crystal grains of the ferromagnetic film are dispersed into the nonmagnetic film by annealing process.

Consequently, the crystal grains of the ferromagnetic film may be isolated in the recording layer such that they are separated not to magnetically interact each other. Thus, magnetization distribution can be made uniform in the recording layer. As a result, the undesirable noise characteristic due to uneven magnetization distribution in magnetization transition regions and their peripheral regions of the magnetic recording medium can be improved.

Furthermore, such a recording layer can be formed that has a thin film thickness, realizes satisfactory coercive force, and attains a product t•Br of less than 100 Gauss•$\mu$m. Therefore, large reproducing output which is fit for high sensitivity performance of the MR head can be derived.

Figure 8A:
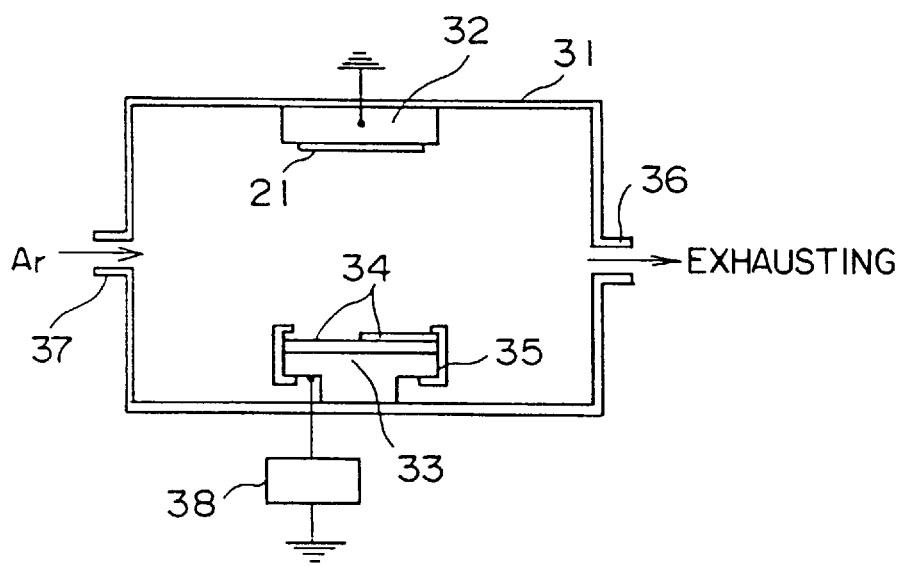
FIG. 8A is a schematic view showing a construction of a sputtering apparatus used to form a magnetic recording layer.
Figure 8B:
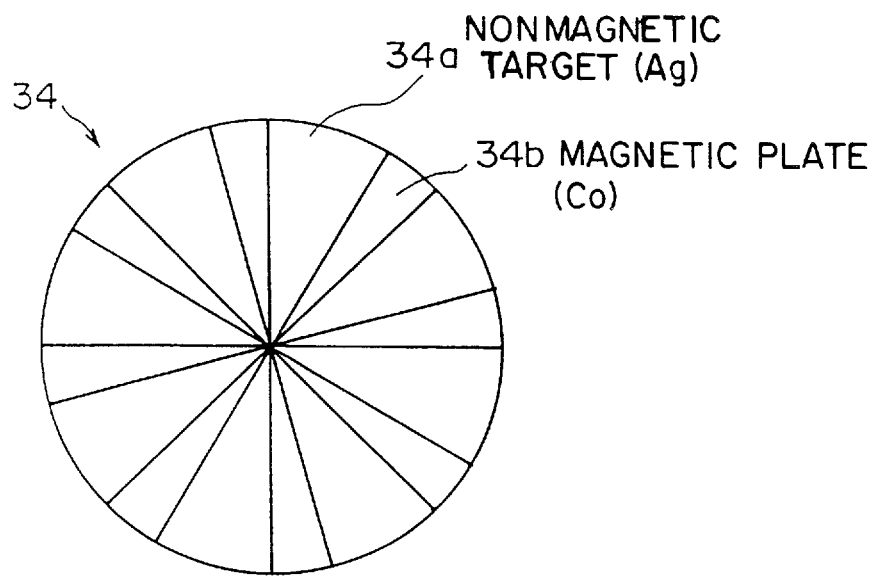
FIG. 8B is a plan view showing a target for use in sputtering process.

(4) A fourth embodiment of the present invention:

FIGS. 7A to 7C are sectional views showing manufacturing steps of the magnetic recording medium according to the fourth embodiment of the present invention. FIG. 8A is a schematic view showing the sputtering apparatus used for stacking the ferromagnetic material and the nonmagnetic material. FIG. 8B is a plan view showing a target used for sputtering process.

To manufacture the magnetic recording medium, the sputtering apparatus shown in FIG. 8A is employed. First, a heat-resistant and nonmagnetic substrate 21 having a diameter of 2.5 inch is fixed on a wafer holder 32 in a chamber 31. As the heat-resistant and nonmagnetic substance 21, the silicon substrate or the carbon substrate which can stand heat in excess of 400° C, for example, may be used.

In addition, a target 34 shown in FIG. 8B is also placed on a target supporting bed 33. The target 34 is formed by arranging a plurality of sectoral magnetic plates 34b discretely on a nonmagnetic target 34a. The target 34 is fixed on the target supporting bed 33 by a frame body 35. In the fourth embodiment, the silver (Ag) plate is used as the nonmagnetic target 34a while the cobalt (Co) plate is used as the magnetic plate 34b.

In this state, argon gas is introduced in the chamber 31 via a gas introducing port 37 while the gas in the chamber 31 is being exhausted from an exhaust port 36, thus holding pressure in an interior of the chamber 31 at 5 mTorr.

Then, after a substrate temperature is not heating, high frequency power of 0.2 kW is applied between the target supporting bed 33 and the wafer holder 32 from a high frequency power source serving as a sputtering power source 38.

Under these sputtering conditions, as shown in FIG. 7A, a magnetic recording layer 25 made of an alloy consisting of a ferromagnetic film 22 and a nonmagnetic substance 23 is formed on the heat-resistant and nonmagnetic substrate 21 to have a thickness of 10 nm. By use of the above target 34, the ferromagnetic films 22 are distributed uniformly into an entire area of the magnetic recording layer 25. A containing rate of the ferromagnetic film 22 in the magnetic recording layer 25 can be controlled by varying the number of sheet of the magnetic plate 34b arranged in the target 34.

If Co is used as the ferromagnetic film 22 and Ag is used as the nonmagnetic substance 23, sizes of the crystal grains of Co are small, like less than or equal to several nm, and plural crystal grains are formed in the film thickness direction. In addition, in some cases, some of the crystal grains are coupled partially with each other. As a result, it becomes unavoidable that the magnetic recording layer 25 has only small coercive force and that variation in magnetization is increased in the magnetization transition regions.

Hence, in case the nonmagnetic substrate 21 on which the magnetic recording layer 25 is formed is heated at a temperature of 500° C. for ten minutes in a heating furnace (not shown), Ag and Co are separately segregated in the recording layer, as shown in FIG. 7B. The crystal grains of Co are completely isolated to have a diameter of 50 nm or less if viewed from the upper side. Also, the size of the crystal grain is formed such that only one crystal grain of Co exists in the direction of the film thickness. This resultant layer may be used as the magnetic recording layer 25. Consequently, it has been found that large crystal grains of Co are grown, and the crystal grains are formed not to be coupled with each other, and also the crystal grains of Co are covered with Ag. This is because Ag and Co are mutually insoluble.

According to the magnetic recording layer 25, it has been confirmed that high coercive force can be derived, variation in magnetization can be small in the magnetization transition regions, and noise power can be reduced when magnetic recording information are read out.

Here the t•Br value of the magnetic recording layer 25 having a film thickness of 10 nm can be obtained as about 100 Gauss•μm. Therefore, the magnetic recording layer 25 can provide a large amplitude output in a state of high recording density if it being used together with the magnetoresistance head.

After the magnetic recording layer 25 is formed as above, as shown in FIG. 7C, a protection film 26 made of carbon is then formed by sputtering on the magnetic recording layer 25 to have a thickness of 10 nm. As the sputtering conditions, a carbon plate is used as the target, pressure of argon gas atmosphere is set at 10 mTorr, a substrate temperature is not heating, and a DC power of 1 kW is applied between the target supporting bed 33 and the wafer holder 32 as the sputtering power source 38.

Figure 9:
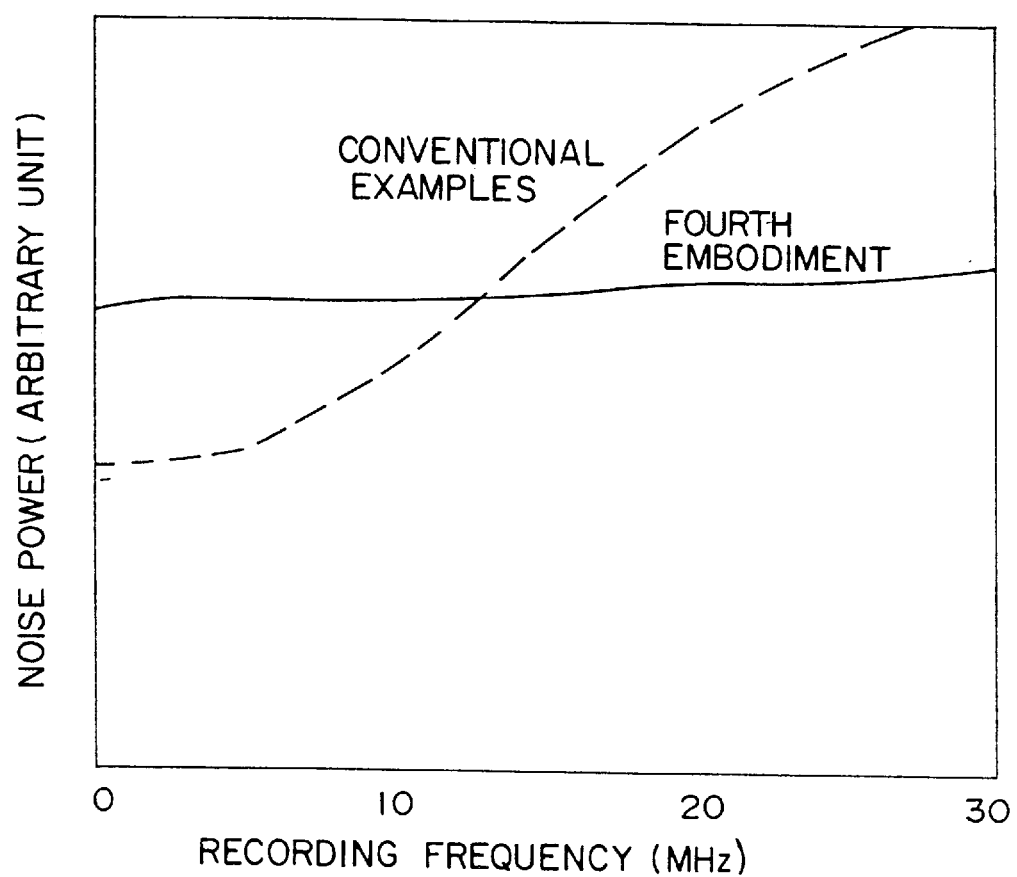
FIG. 9 is a view showing relations between recording signal frequency and noise power in the magnetic recording medium according to the fourth embodiment of the present invention and the conventional magnetic recording medium.

In FIG. 9, a solid line shows the relation between noise power and recording signal frequency, which has been investigated when recording information are read from the magnetic recording medium including the magnetic recording layer 25 formed as above. The noise power does not depend on the magnitude of the recording signal frequency to be virtually constant. If the recording signal frequency exceeds about 13 MHz, noise power can be reduced in contrast to the conventional magnetic recording medium shown in FIG. 9.

Using the magnetoresistance head, noise power has been measured in a state wherein the relative velocity between the MR head and the magnetic recording medium (circumferential velocity) is selected as 10 m/s. Now the recording density is 100 kFRPI when the recording signal frequency is selected as 20 MHz.

(5) A fifth embodiment of the present invention:

In the fourth embodiment, the magnetic recording layer 25 is heated at 500° C. after being formed on the heat-resistant and nonmagnetic substrate 21. This heating process may be executed simultaneously in the course of stacking the magnetic recording layer 25. According to this process, the same advantage as that in the fourth embodiment can also be obtained.

Figure 10:
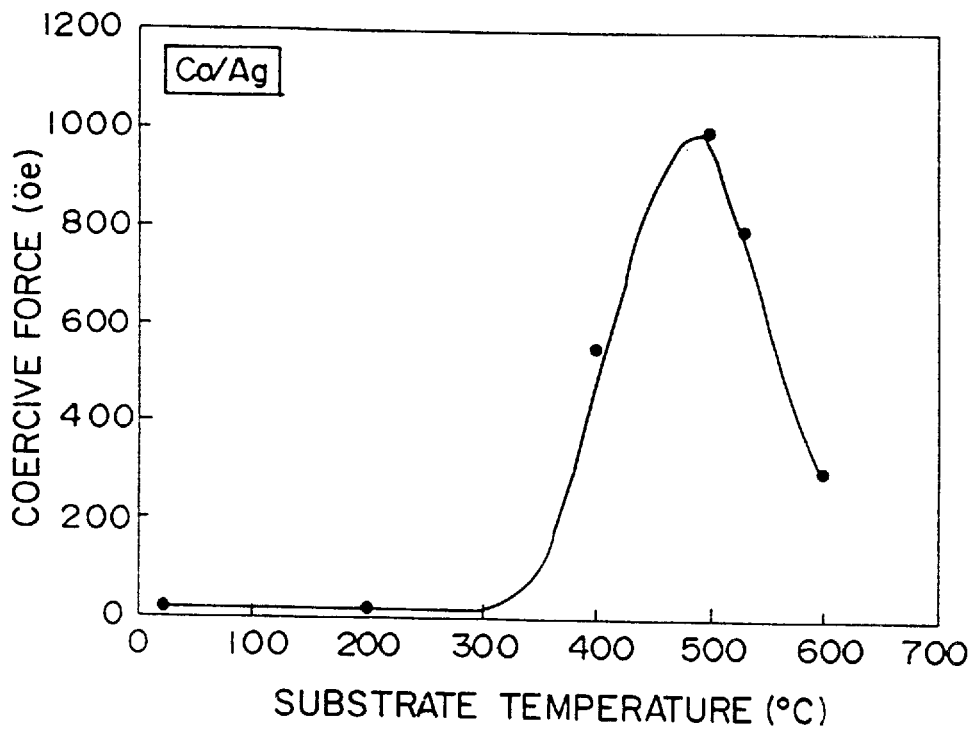
FIG. 10 is a view showing a relation between a substrate temperature and coercive force when a magnetic recording layer according to a fifth embodiment of the present invention being formed.

Therefore, by examining change of coercive force in the magnetic recording medium due to difference in heating process to form the magnetic recording layer 25, the result shown in FIG. 10 has been obtained.

According to FIG. 10, it has been found that coercive force is increased abruptly around 400° C. and is at a maximum at 500° C. if the substance temperature is further increased, and that coercive force is then gradually decreased with further increase of the substance temperature. Thus, high coercive force and low substance noise can be obtained over the temperature range of 400° to 550° C.

Figure 11:
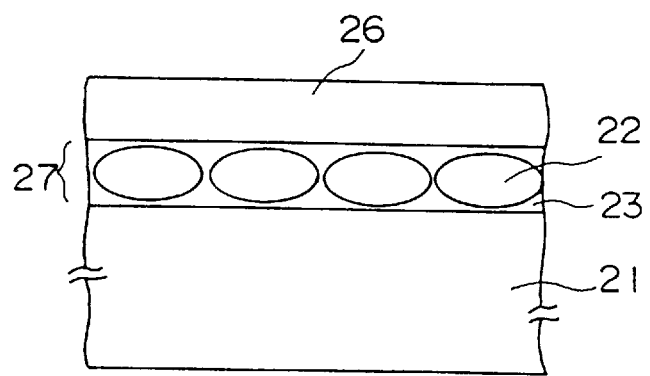
FIG. 11 is a sectional view showing a magnetic recording medium according to the fifth embodiment of the present invention.

Then, in case the annealing temperature is set to 400° C., a sectional shape of the magnetic recording medium 27 is shown in FIG. 11. The ferromagnetic film 22 is turned into isolated grains, and the size thereof is substantially identical to that of the fourth embodiment.

The same conditions as those in the first embodiment have been used as conditions for forming the magnetic recording layer 27 except for the substrate temperature to accomplish the result in FIG. 10. In addition, the same conditions as those in the fourth embodiment except for no heating of the substrate are also employed to grow the protection film 26.

(6) A sixth embodiment of the present invention:

Although Co has been used as the ferromagnetic material contained in the magnetic recording layers 25, 27 in the fourth and fifth embodiments, iron, cobalt-chromium alloy etc. may be used. As the nonmagnetic substance, copper (Cu) in which such ferromagnetic film is not soluble may be used in addition to Ag.

The magnetic recording layers have been manufactured by heating mixed layers having combinations of the ferromagnetic film and the nonmagnetic substance shown in Table II below at 500° C. Then noise power caused by respective magnetic recording layers has been checked. It has been appreciated that such noise power are smaller than those in the conventional magnetic recording layer. Respective noise powers in Table II are comparative values if noise power in the conventional magnetic recording medium is assumed as 1.

TABLE II

| NONMAGNETIC LAYER | FERROMAGNETIC LAYER | NOISE POWER |
|---|---|---|
| Ag | Co | 0.8 |
| Ag | $Co_{90}Cr_{10}$ | 0.75 |
| Ag | $Co_{80}Pt_{20}$ | 0.8 |
| Ag | $Co_{50}Pt_{50}$ | 0.8 |
| Ag | $Co_{80}Sm_{20}$ | 0.8 |
| Ag | $Co_{89.5}Sm_{10.5}$ | 0.8 |
| Ag | Fe | 0.75 |
| Cu | Co | 0.85 |
| Cu | $Co_{90}Cr_{10}$ | 0.8 |
| Cu | $Co_{80}Pt_{20}$ | 0.75 |
| Cu | $Co_{50}Pt_{50}$ | 0.8 |
| Cu | $Co_{80}Sm_{20}$ | 0.8 |
| Cu | $Co_{89.5}Sm_{10.5}$ | 0.8 |
| Cu | Fe | 0.75 |

The magnetic recording medium in which the $CoCr_{12}Ta_2$ having a thickness of 20 nm is formed on the substrate, as shown in FIG. 1, was used as the conventional magnetic recording medium.

The recording signal frequency is selected as 20 MHz at the time of measuring noise power.

Referring to Table II, it has been confirmed that, if the magnetic recording layer comprising the nonmagnetic substance and the ferromagnetic film, both being mutually insoluble, is formed and then heated at 500° C., noise power in the magnetic recording layer can be reduced.

In any circumstances, if Ag is used as the nonmagnetic substance and also $Co_{90}Cr_{10}$ is used as the ferromagnetic film and both substances are formed on the nonmagnetic substance having heat-proof property in excess of 400° C., the crystal grains of the ferromagnetic film are readily formed as the hcp structures. Thus, high coercive force can easily be obtained in comparison with the case where the magnetic recording layer is formed with Co. In the case where Fe, $Co_xCr_{100-x}$ (x is 90 or more), $Co_yPt_{100-y}$ (y is 70 or more, or 40 to 50) or $Co_ASm_{100-A}$ (A is 77.3, or 80 or more) may be used as a substance of the ferromagnetic film, the advantages can be obtained.

Figure 12:
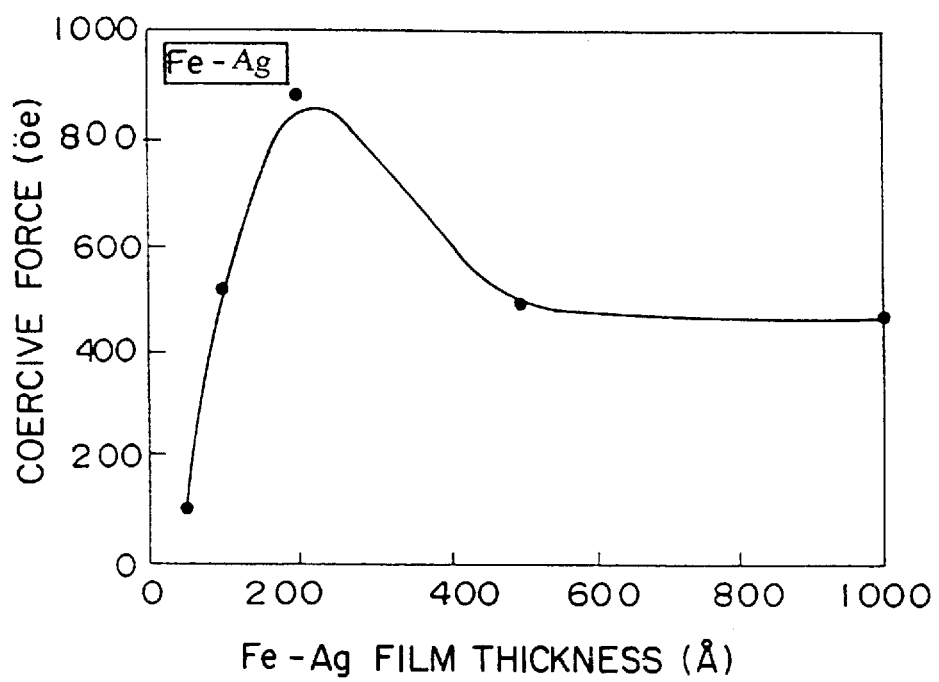
FIG. 12 is a view showing a relation between a film thickness and coercive force in a magnetic recording layer according to a sixth embodiment of the present invention.

If the relation between the film thickness of the magnetic recording layer and coercive force by the magnetic recording layer after the magnetic recording layer consisting of Ag serving as the nonmagnetic substance and Fe serving as the ferromagnetic film has been formed under the conditions given in the fourth embodiment, the result shown in FIG. 12 has been derived. According to FIG. 12, it has been found that large coercive force can be derived if the film thickness of the magnetic recording layer is set over a range of 50 nm to 10 nm (500 Å to 100 Å). With reference to all combinations of the ferromagnetic films and the nonmagnetic substances listed in Table II, this relation has also been derived.

(7) A seventh embodiment of the present invention:

In any case, if the silicon substrate is used as the heat-resistant and nonmagnetic substrate 21 shown in the above embodiments, silicon is diffused into the ferromagnetic substance 22 in the magnetic recording layer 25, otherwise the ferromagnetic film 22 is readily diffused into the silicon substrate. Thus, there is a possibility such diffusion causes degradation of magnetic characteristics of the magnetic recording layer.

Figure 13:
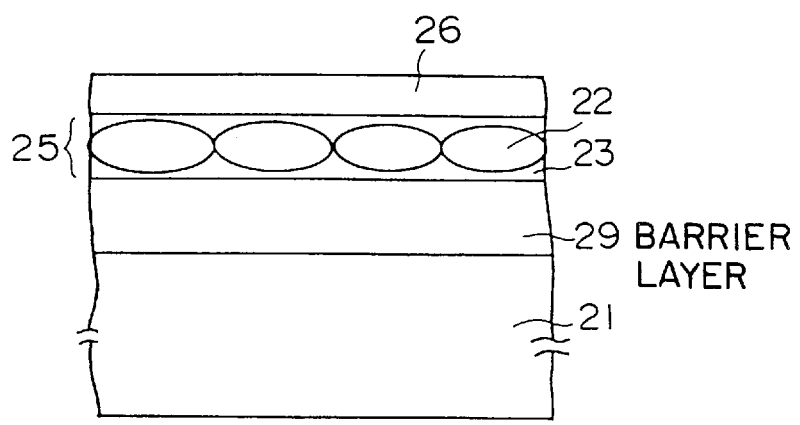
FIG. 13 is a sectional view showing the magnetic recording medium according to a seventh embodiment of the present invention.

Hence, as shown in FIG. 13, it would be preferable to prevent diffusion of silicon and the ferromagnetic film by intervening a barrier layer 29 between the magnetic recording layer 25 and a nonmagnetic wood ash 21 formed of silicon. As the barrier layer 29, $SiO_2$ film may be used which is formed by oxidizing a surface of the silicon substrate so as to have a film thickness of about 300 nm, for example.

According to the fourth to seventh embodiments aforementioned, the magnetic recording layer made of the alloy consisting of the ferromagnetic film and the nonmagnetic substance is formed on the heat-resistant and nonmagnetic substrate to have a thickness of less than 30 nm, and further the magnetic recording layer is heated in excess of 400° C. during it is formed or after it is formed, to thus form plural isolated grains made of the ferromagnetic substance and having an average grain diameter of 50 nm or less. Therefore, grains of the ferromagnetic film can grow large, and variation in magnetization in the magnetization transition regions can be reduced. As a result, in contrast to the conventional recording medium, noise can be reduced upon recording/reproducing signals as well as the dependency of noise power on the recording signal frequency can also be reduced.

Also, coercive force of the magnetic recording layer may be increased by setting an annealing temperature at more than 400° C., preferably in a range of 400° to 550° C.

(8) An eighth embodiment of the present invention:

FIGS. 14A to 14D are sectional views showing manufacturing steps of a magnetic recording medium according to an eighth embodiment of the present invention.

Figure 14A:
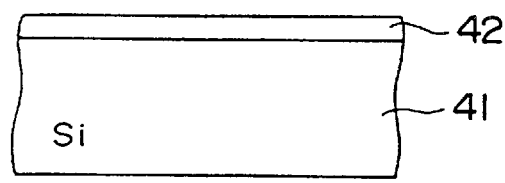
FIGS. 14A to 14D are sectional views showing a magnetic recording medium and manufacturing steps therefor according to an eighth embodiment of the present invention.

First, as shown in FIG. 14A, a diffusion preventing layer 42 made of $SiO_2$ (silicon dioxide) is formed on a single crystal silicon substrate 41 by sputtering or thermal oxidation to have a thickness of 100 nm.

Figure 14B:
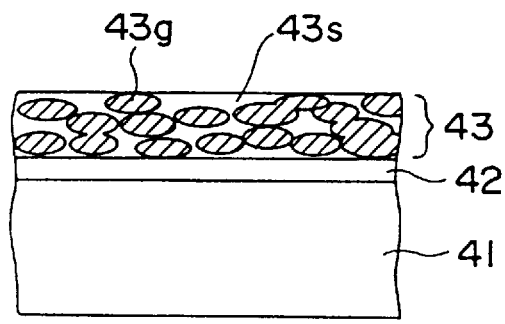

Then, as shown in FIG. 14B, a granular magnetic film 43 in which magnetic fine grains 43g like iron (Fe) is diffused into the $SiO_2$ 43s is formed on the diffusion preventing layer 42 by sputtering to have a thickness of 100 nm. The granular magnetic film 43 is grown at a substrate temperature of a room temperature (a normal temperature) and in argon atmosphere.

Figure 14C:
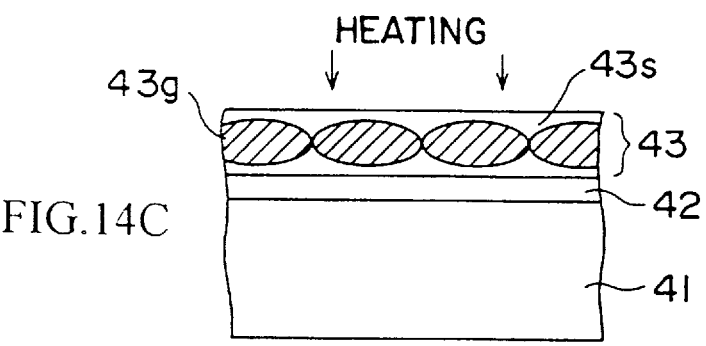

After this, as shown in FIG. 14C, crystal property of the magnetic fine grains can be improved by annealing process in inert gas atmosphere.

Figure 14D:
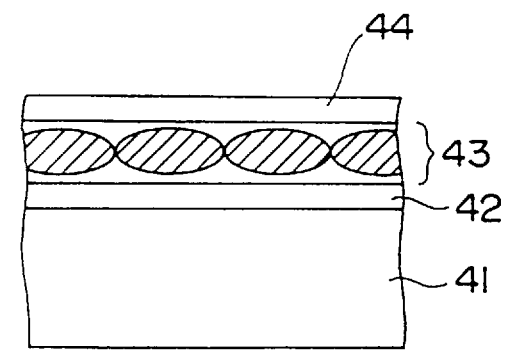

Subsequently, as shown in FIG. 14D, a protection film 44 made of carbon (C) and having a thickness of 15 nm is formed on the granular magnetic film 43. Thereafter, the magnetic recording medium has been completed by coating a lubricant on the protection film 44.

Figure 15:
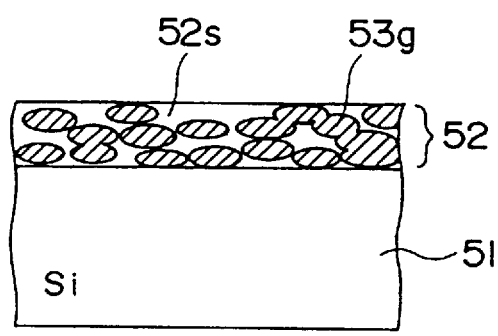
FIG. 15 is a sectional view showing a comparative sample in the case in which the present invention is not applied.

To examine the effect produced by annealing process of the magnetic recording medium having the structure set forth above, a comparative sample without the diffusion preventing layer is also prepared. As shown in FIG. 15, this comparative sample has such a structure that the granular magnetic film 52 is formed directly on the single crystal silicon substrate 51 without an interposition of the diffusion preventing layer. The granular magnetic film 52 is constituted by dispersing the fine grains 53g of the magnetic substance into the $SiO_2$ 53s. Manufacturing conditions of the comparative sample are selected to be the same as in FIGS. 14A and 14B excluding the diffusion preventing layer.

Examinations have been tried to check how respective granular magnetic layers 43 and 53 in the magnetic recording medium shown in FIG. 14B and the comparative sample in FIG. 15 are changed by annealing process.

(Change of Saturation Magnetization)

Figure 16:
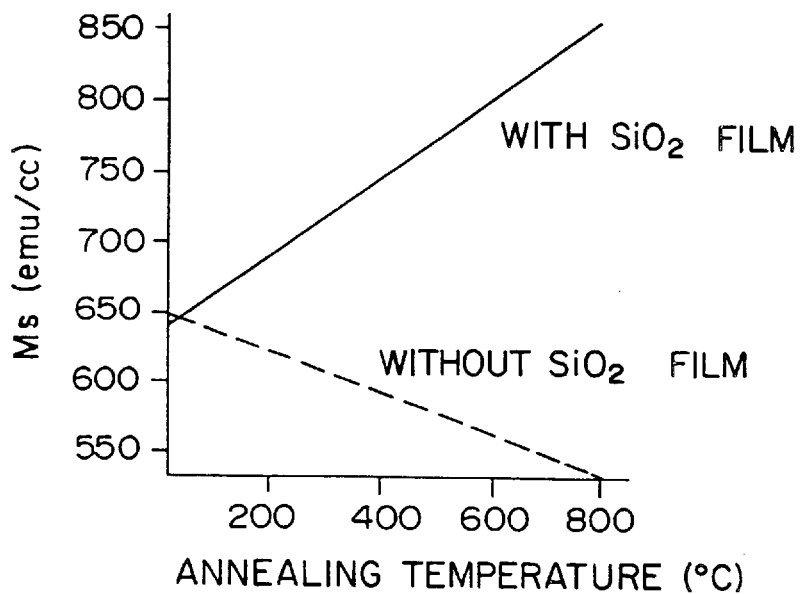
FIG. 16 is a view showing relations between an annealing temperature and saturation magnetization respectively in the magnetic recording medium which is formed on the silicon substrate via an SiO$_2$ film according to the eighth embodiment of the present invention and the magnetic recording medium which is formed directly on the silicon substrate.

When changes in the value of saturation magnetization (Ms) caused by annealing process is examined, the result shown in FIG. 16 can be derived. In FIG. 16, a solid line indicates a characteristic between annealing temperature vs saturation magnetization of the magnetic recording medium shown in FIG. 14C, while a broken line indicates a characteristic between annealing temperature vs saturation magnetization of the comparative sample shown in FIG. 15. Here the abscissa indicates an annealing process temperature and the ordinate indicates a magnitude Ms (emu/cc) of saturation magnetization of the magnetic recording medium after the annealing process has been done.

As may be evident from the broken line in FIG. 16, in the comparative sample without the diffusion preventing layer, the value of Ms is decreased in proportion with increase of the temperature used for the annealing process. Since reduction of Ms in the magnetic recording medium causes reduction of the reproducing output, it is not preferable to anneal the comparative sample. The value of Ms still remains low unless the annealing process is executed yet.

As may be apparent from the solid line in FIG. 16, according to the magnetic recording medium of the eighth embodiment, it has been understood that the value of Ms is increased in proportion to increase of the annealing temperature. In order to obtain a high output at the time of reproducing information, the higher the Ms becomes, the more advantageous it becomes.

Like this, in both cases where the $SiO_2$ diffusion preventing layer 42 is intervened between the silicon substrate and the granular magnetic film and no diffusion preventing layer is intervened, the following is the reason why the value of Ms becomes different by the annealing process.

In other words, this is because the magnetic fine-grains 53g formed of iron and silicon in the silicon substrate 51 are mutually diffused by heat in the comparative sample to generate silica iron, and therefore an amount of the magnetic substance is reduced. It can be considered that silicon elements and iron are diffused via the boundary between the magnetic fine grains 53g and the $SiO_2$ 53s in the granular magnetic film 53 of the comparative sample.

On the other hand, in the eighth embodiment shown in FIG. 14B, since mutual diffusion of silicon and the magnetic fine grains 43a by heat is prevented by the diffusion preventing layer 42, an amount of the magnetic substance is not reduced, and also sizes of the fine grains are increased by heat treating.

Next, as shown in FIG. 14B, it has been examined by the XRD (X-ray diffraction) how respective crystal structure of the granular magnetic film 43, which is formed on the silicon substrate 41 via the $SiO_2$ diffusion preventing layer 42, and of the granular magnetic film 53, which is directly formed on the silicon substrate 51 shown in FIG. 15, are changed by the annealing process.

Figure 17:
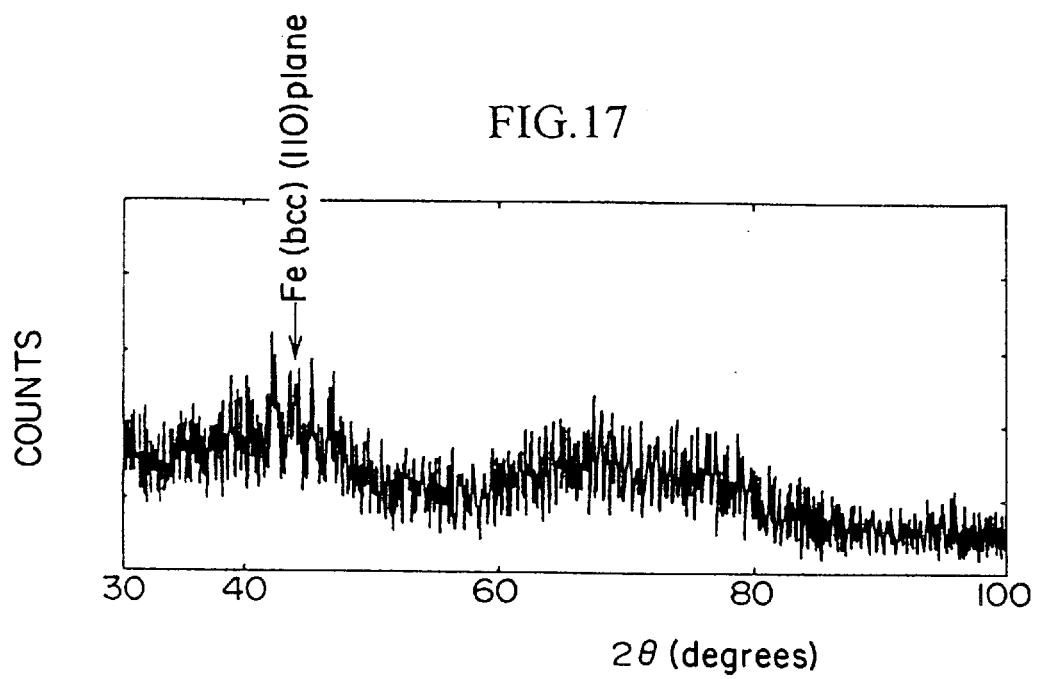
FIG. 17 is a view showing the result of X-ray diffraction of a granular magnetic layer executed immediately after it is grown via the SiO$_2$ film on the silicon substrate according to the eighth embodiment of the present invention.

FIG. 17 shows the measurement result of XRD of the granular magnetic film 43 immediately after the magnetic film 43 being formed on the silicon substrate 41 via the SiO$_2$ diffusion preventing layer 42. While, FIG. 18 shows the measurement result of XRD of the granular magnetic film 53 immediately after the magnetic film 53 being directly on the silicon substrate 51.

Figure 18:
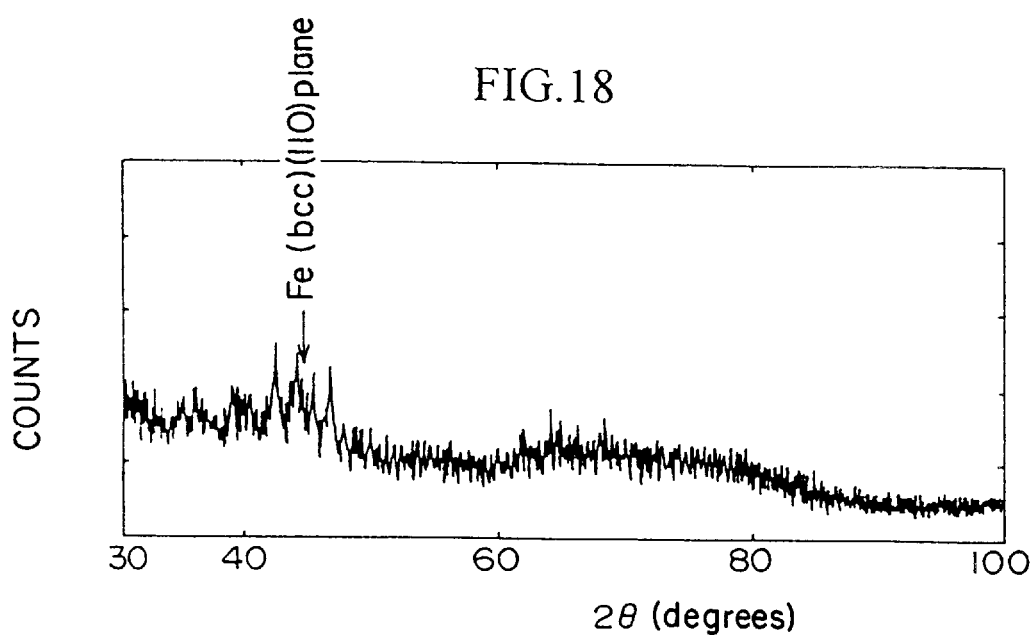
FIG. 18 is a view showing the result of X-ray diffraction of the granular magnetic layer executed immediately after it is grown directly on the silicon substrate according to the comparative example.

If the result in FIG. 17 is compared with the result in FIG. 18, there exists no remarkable difference between the X-ray diffraction spectra of both granular magnetic films 43 and 53. In detail, it scarcely causes great difference in crystal properties between the granular magnetic films 43 and 53 before annealing process, whether the SiO$_2$ diffusion preventing layer 42 including no iron is provided or not. The fact that crystal grains of the magnetic grains 43g, 53g in both granular magnetic films 43, 53 are very small under the as-grown condition without annealing may be considered as the reason why the X-ray diffraction ray from both granular magnetic films 43 and 53 shows weak strength.

Figure 19:
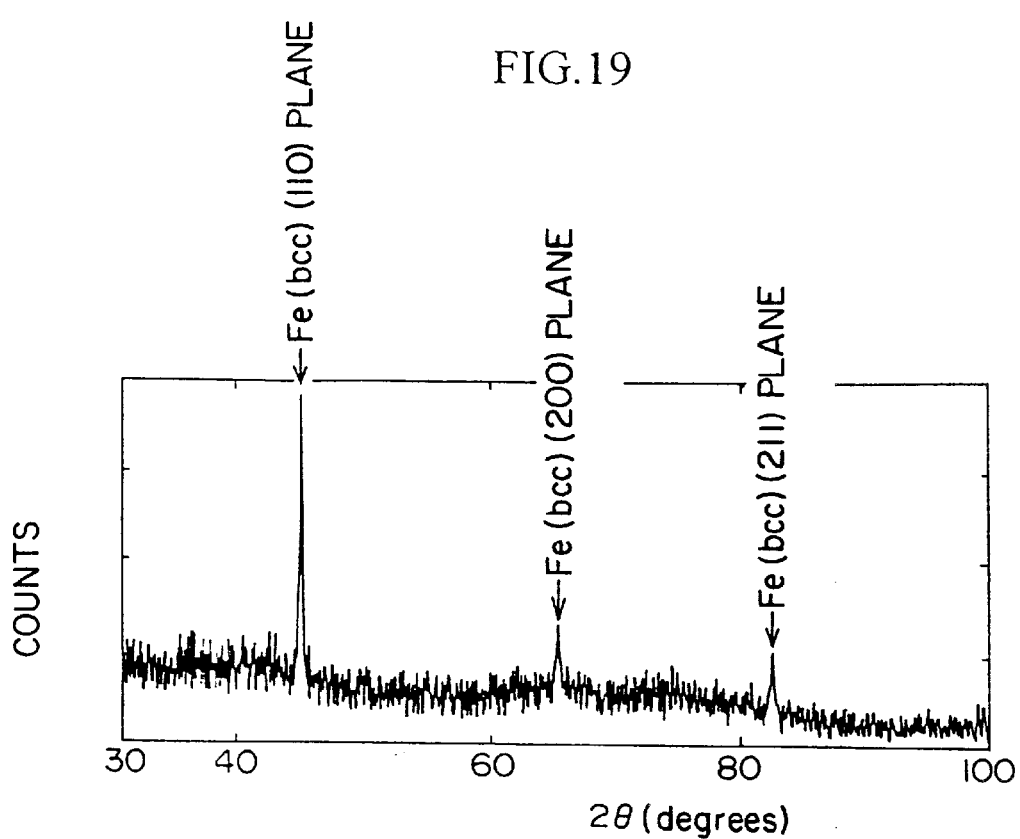
FIG. 19 is a view showing the result of X-ray diffraction of the granular magnetic layer after it is formed via SiO$_2$ film on the silicon substrate and then annealed at 800° C. for ten minutes according to the eighth embodiment of the present invention.
Figure 20:
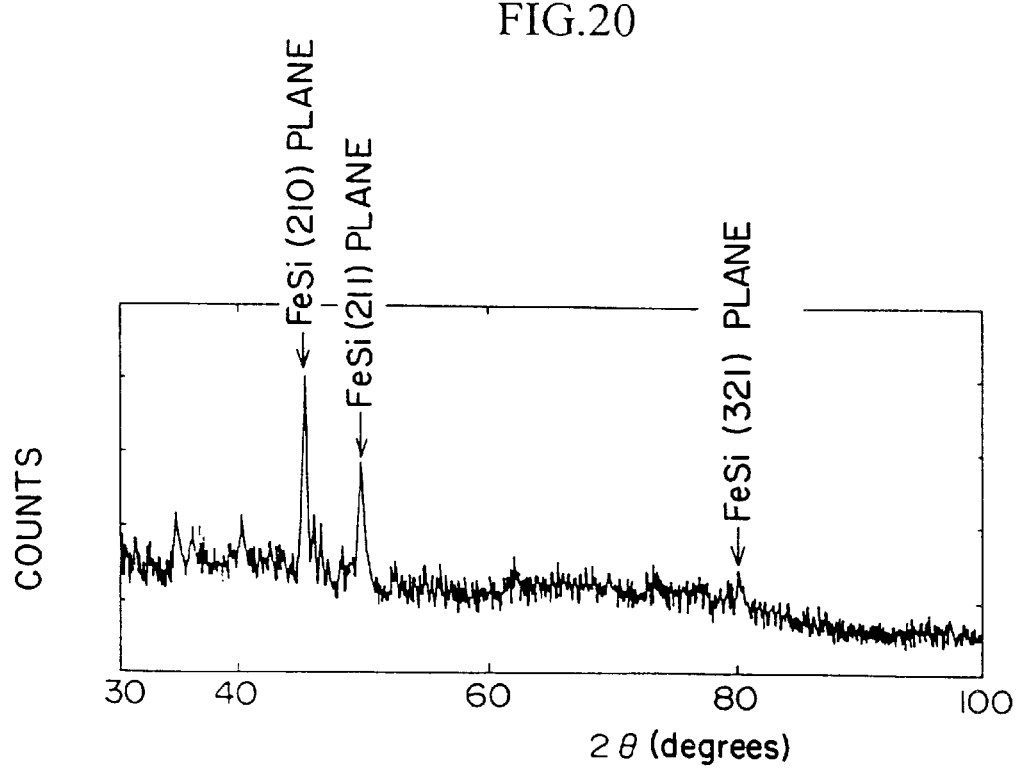
FIG. 20 is a view showing the result of X-ray diffraction of the granular magnetic layer after it is formed directly on the silicon substrate according to the comparative example and then annealed at 800° C. for ten minutes.

Then, the XRD measurement results are shown in FIGS. 19 and 20 which are obtained after the granular magnetic film is annealed at 800° C. for ten minutes.

FIG. 19 shows the XRD measurement result obtained after the granular magnetic film 43 in the magnetic recording medium shown in FIG. 14B is annealed. According to the measurement result, it has been found that only α-Fe diffraction rays appear as peaks, and the peaks have a large amplitude. In addition, no peak from a compound of iron and silicon is watched. The reason may be deduced as that mutual diffusion of silicon atoms in the silicon substrate 41 and iron atoms in the granular magnetic film 43 can be prevented by the SiO$_2$ diffusion preventing layer 42 formed between the silicon substrate 41 and the granular magnetic film 43. While, the reason why Ms is increased in the solid line in FIG. 16 by annealing process at 800° C. for ten minutes is that an amount of the ferromagnetic a-Fe is not reduced.

FIG. 20 shows the XRD measurement result obtained after the comparative sample shown in FIG. 15 is annealed. According to this measurement result, only diffraction rays from a compound of iron and silicon appear as peaks. This may be considered such that the body-centered cubic (bcc) system iron (α-Fe), which exists in the granular magnetic film 53 as the magnetic grains 53g before annealing, is combined with silicon atoms by annealing process to thus form silica iron. While, the reason why Ms is reduced in the broken line in FIG. 16 by annealing process at 800° C. for ten minutes is that an amount of the ferromagnetic α-Fe is reduced.

(Change of Coercive Force)

Figure 21:
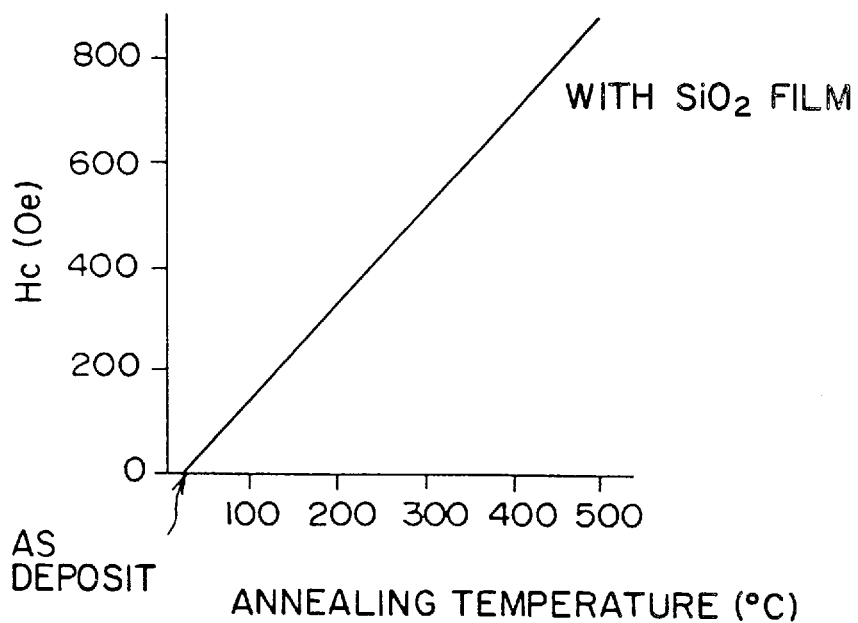
FIG. 21 is a view showing a relation between an annealing temperature and coercive force in the magnetic recording medium formed via the $SiO_2$ film on the silicon substrate according to the eighth embodiment of the present invention.

FIG. 21 shows the result which has been obtained by the experiment to confirm how coercive force of the granular magnetic film 43 serving as the magnetic recording medium shown in FIG. 14B is changed by annealing process. In FIG. 21, the abscissa indicates an annealing temperature (°C.), and the ordinate indicates coercive force Hc (Oe).

As may be evident from FIG. 21, if the annealing temperature is increased higher, coercive force of the granular magnetic film 43 is increased in proportion. At the annealing temperature of 500° C, coercive force becomes 800 oersted (Oe). Here ten minutes is selected as the annealing time.

With the above, it has been appreciated that, if the diffusion preventing film is interposed between the granular magnetic film and the silicon substrate, the magnetic recording medium having coercive force suitable for large reproducing output and high recording density can be achieved by annealing process.

In the case in which a film wherein magnetic fine grains such as nickel (Ni), cobalt (Co), or others are distributed into the SiO$_2$ film is used as the granular magnetic film, the nonmagnetic film interposed between the granular magnetic film and the silicon substrate can prevent the compound of fine grains of magnetic substance and silicon from being generated.

In any case, according to the magnetic recording medium shown in FIG. 14D, since both the diffusion preventing layer 42 and the granular magnetic film 43 are formed with the same SiO$_2$ and also the SiO$_2$ and the silicon substrate 41 may be tightly adhered to each other, film exfoliation because of thermal expansion does not occur even if they are annealed at high temperature in excess of 300° C.

Incidentally, the nonmagnetic film such as Si$_3$N$_4$, SiON, Cu, Cr or the like as well as SiO$_2$ may be used.

As discussed earlier, according to the eighth embodiment, since the nonmagnetic layer including no magnetic grains is formed between the silicon substrate and the nonmagnetic layer including magnetic grains and also the nonmagnetic layer including no magnetic grains therein is used as the diffusion preventing layer, mutual diffusion of silicon in the silicon substrate and magnetic grains by heat can be prevented by the diffusion preventing layer.

Therefore, since the compound of the magnetic substance and silicon is not generated, reduction of the magnetic substance is prevented, and the magnetic recording medium having high coercive force and enabling high recording density can be achieved. In addition, the granular magnetic layer excluding the magnetic fine grains and the diffusion preventing layer are formed with the same material, difference in thermal stress between the granular magnetic layer and the diffusion preventing layer can be eliminated, so that there is no possibility of film exfoliation. As a result, the stable layer structure can be attained.

Besides, since a product of the thickness of the silicon oxide layer including the magnetic fine grains and residual magnetization is set to be less than 100 Gauss•μm, the magnetic recording layer can be applied to the magnetoresistance head.

Furthermore, in the case in which any one of iron, cobalt, and nickel is included as the magnetic fine grains, the effect of the diffusion preventing layer becomes conspicuous since their atoms and silicon are easily combined with each other by annealing process.

Figure 22:
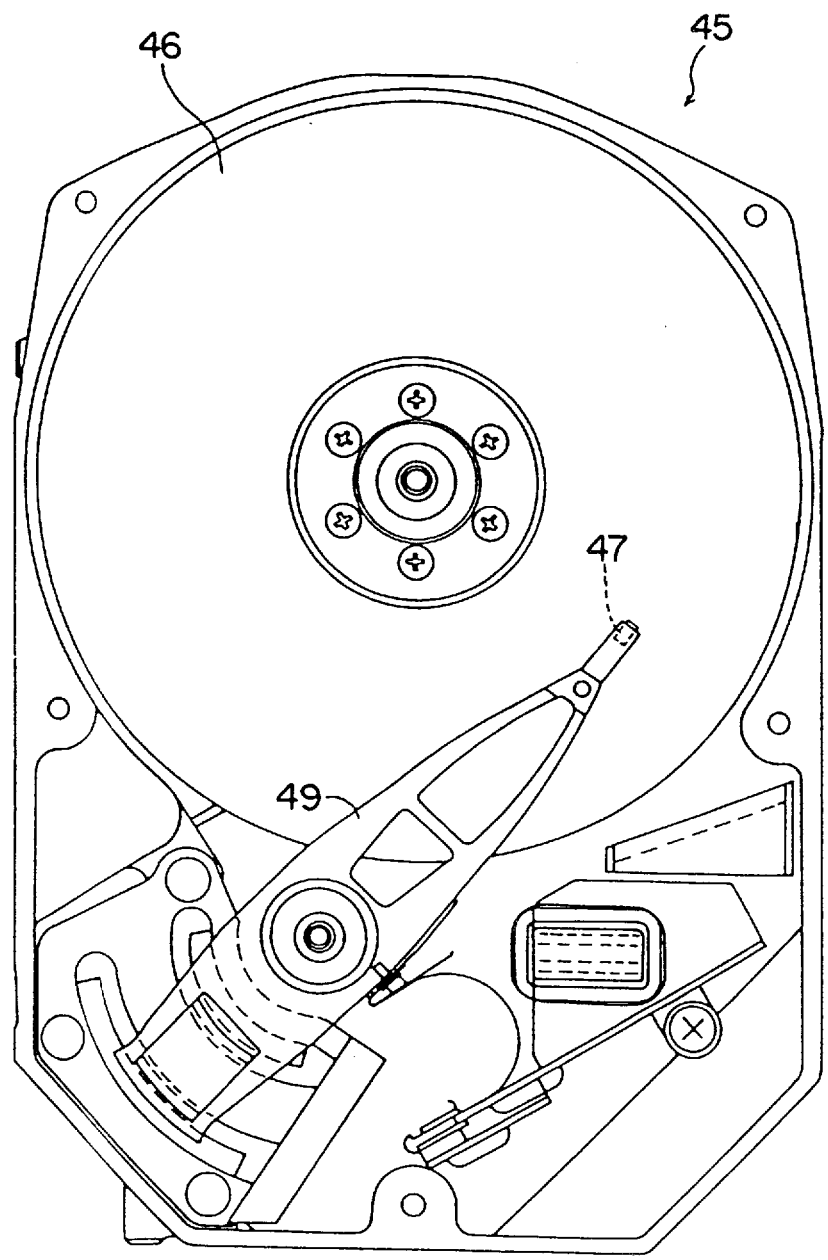
FIG. 22 is a plan view showing an example of the magnetic recording device having the magnetic recording medium according to embodiments of the present invention.

(9) Explanation of a magnetic recording drive according to a ninth embodiment of the present invention:

With reference to FIG. 22, a magnetic recording drive in which the magnetic recording mediums according to the first to eighth embodiments are used selectively in the magnetic disk will be explained.

As shown in FIG. 22, a magnetic recording drive 45 comprises a magnetic disk 46, a slider 47 having a MR head, and a spring arm 48 for supporting the slider 47.

Figure 23A:
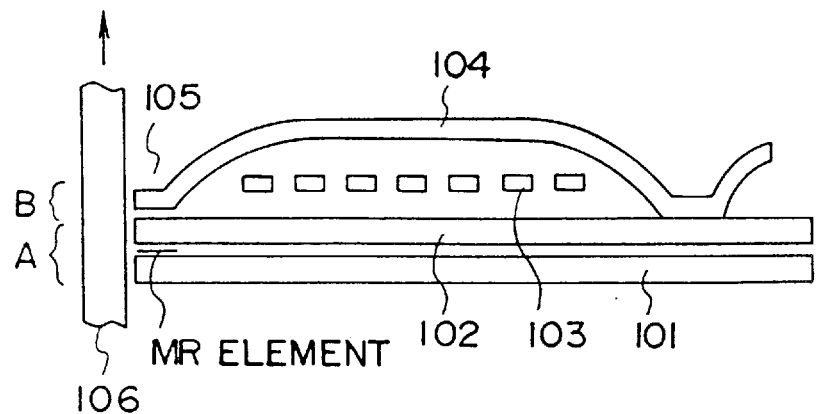
Figure 23B:
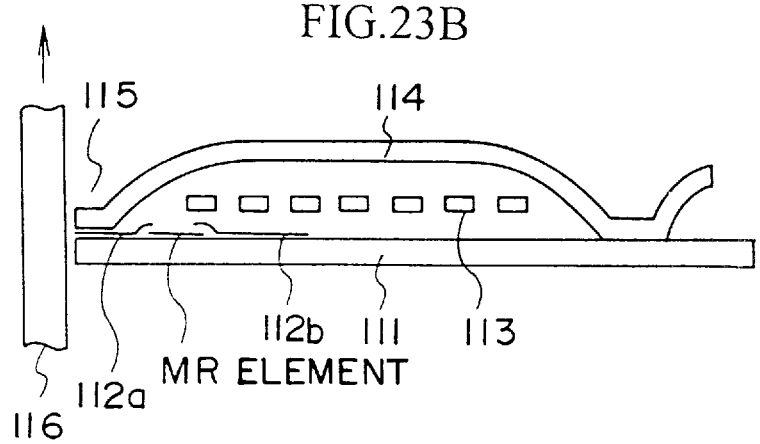
Figure 23C:
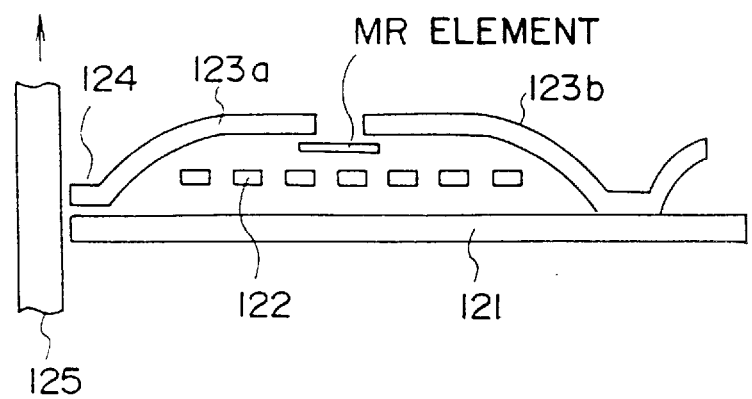

Referring to FIGS. 23A to 23C, details of the magnetic recording medium and the magnetic head in the magnetic recording device will be explained. FIGS. 23A to 23C are sectional views.

FIG. 23A shows a composite type MR head. An A portion denotes a reproducing head, and a B portion denotes a recording head. A soft magnetic layer 102 is used as a magnetic shield of the reproducing head and magnetic poles of the recording head commonly.

According to this magnetic recording device, since the magnetic recording mediums according to the above embodiments are used, high density recording, high reproducing output, and small noise can be achieved.

As shown in FIG. 23A, in the reproducing head portion, soft magnetic layers 101, 102 serving as the magnetic shield are opposed to each other at a distance. The above MR element is placed in a gap between the magnetic recording medium 106 and the opposing portion 105. Leakage magnetic field from the magnetic recording medium 106 can be detected directly by the MR element.

In addition, in the recording head portion, soft magnetic layers 102, 104 serving as the magnetic poles are opposed to each other at a distance. A coil 103 for generating the magnetic flux which flows through the soft magnetic layers 102, 104 is arranged in a gap between the soft magnetic layers 102, 104. Recording on the magnetic recording medium 106 is effected by generating the leakage magnetic field from the gap in the opposing portion 105 based on the magnetic flux.

FIG. 23B shows an in-gap type MR head having a flux guide. As shown in FIG. 23B, soft magnetic layers 111, 114 serving as magnetic poles are placed oppositely at a distance. The MR element is put in the gap between a magnetic recording medium 116 and an opposing portion 115. A coil 113 for generating the magnetic flux passing through the soft magnetic layers 111, 114 is formed in a gap between the soft magnetic substances 111, 114.

In order to avoid corrosion or direct contact to the magnetic recording medium, the MR element is placed in the inside of the magnetic head without protruding toward the opposing portion 115 of the magnetic recording medium 116. A flux guide 112a which is electrically isolated from the MR element and magnetically coupled with the MR element is protruded to the opposing portion 115. Leakage magnetic field generated from the magnetic recording medium 116 enters into the flux guide 112a, and is then detected by the MR element. Another flux guide 112b which is also electrically isolated from the MR element and magnetically coupled with the MR element is provided at other end of the MR element, and leads the magnetic flux passed through the MR element to the soft magnetic layers 111, 114.

FIG. 23C shows a yoke type MR head. As shown in FIG. 23C, soft magnetic layers 121, 123a and 123b serving as magnetic poles are placed oppositely at a distance. A coil 122 for generating the magnetic flux passing through the soft magnetic layers 121, 123a and 123b is formed in a gap between the soft magnetic layers 121, 123a and 123b. The MR element is placed at the cut portion of the soft magnetic layers 123a and 123b in such a manner that it is electrically isolated from the soft magnetic layers 123a and 123b and also it is magnetically coupled with them. Recording on the magnetic recording medium 106 is effected by generating the leakage magnetic field from the gap in the opposing portion 124 by virtue of the magnetic flux which is generated by the coil 122 and passed through the soft magnetic layers 121, 123a and 123b.

In the magnetic recording device shown in FIGS. 23A to 23C, substrates on which the magnetic heads are formed, insulating films formed between the soft magnetic layers, etc. are omitted.

In addition, the magnetic recording medium according to the embodiments of the present invention may be used in not only the above magnetic recording drive but also various recording drives, each having a writing portion and a reading portion.

Furthermore, the above magnetic recording medium may also be used in the reproducing only magnetic recording drive.

What is claimed is:

1. A magnetic recording medium comprising:

a magnetic recording layer including ferromagnetic grains and a nonmagnetic substance, said ferromagnetic grains including Fe, Co, $Co_x$, $Cr_{100-x}$ (x is 90 or more), $Co_y Pt_{100-y}$ (y is 70 or more, or 40 to 50), or $Co_A Sm_{100-A}$ (A is 77.3, or 80 or more) as a major constituent, said nonmagnetic substance including Ag or Cu as a major constituent;

wherein said ferromagnetic grains are formed to have an average grain diameter of 50 nm and not to be isolated in the direction along a layer surface, and wherein a product of residual magnetization and a film thickness of said magnetic recording layer is less than or equal to 150 Gauss•μm.

2. A magnetic recording device comprising: a a magnetic recording medium set forth in claim 1; and a magnetoresistance reproducing head.

3. A magnetic recording medium comprising:

a silicon substrate;

a first nonmagnetic layer formed of a silicon oxide layer on said silicon substrate, and including no magnetic grain therein; and a second nonmagnetic layer formed of the same material as that of said first nonmagnetic layer on said first nonmagnetic layer, and including magnetic grains therein, said magnetic grains being formed of material which includes any one of iron, cobalt, and nickel, or at least one kind of them; and wherein a product of residual magnetization and a thickness of said second nonmagnetic layer which includes said magnetic grains therein is less than or equal to 150 Gauss•μm.

4. A magnetic recording device comprising:

a magnetic recording medium set forth in claim 3; and a magnetic head for reading and writing magnetic recording information from and into said magnetic recording medium.

* * * * *

UNITED STATES PATENT AND TRADEMARK OFFICE
CERTIFICATE OF CORRECTION

PATENT NO. : 5,774,783
DATED : June 30, 1998
INVENTOR(S) : Kaitsu et al.

It is certified that error appears in the above-identified patent and that said Letters Patent is hereby corrected as shown below:

Column 2, line 23, delete "KFRPI" and insert --kFRPI-- therefor

Column 5, line 7, delete "SIN" and insert --S/N-- therefor

Column 7, line 64, delete "Isolated" and insert --isolated-- therefor

Column 8, line 7, delete "Is" and insert --is-- therefor

Column 10, line 38, table 1, delete "$Co_{69.5}$" and insert --$Co_{89.5}$--

UNITED STATES PATENT AND TRADEMARK OFFICE
CERTIFICATE OF CORRECTION

PATENT NO. : 5,774,783
DATED : June 30, 1998
INVENTOR(S) : Kaitsu et al.

It is certified that error appears in the above-identified patent and that said Letters Patent is hereby corrected as shown below:

Column 10, line 52, table 1, delete "$Co_{69.5}$"

and insert --$Co_{89.5}$-- therefor

Column 10, line 57, table 1, delete "$Co_{69.5}$"

and insert --$Co_{89.5}$-- therefor

Column 17, line 34, delete "a-Fe" and insert

--$\alpha$-Fe-- therefor

Column 20, line 29, after "comprising:"

delete "a"

Signed and Sealed this

Twenty-fourth Day of November, 1998

BRUCE LEHMAN

Attest:

Attesting Officer

Commissioner of Patents and Trademarks